(12) United States Patent
Kyogoku et al.

(10) Patent No.: US 10,888,780 B2
(45) Date of Patent: Jan. 12, 2021

(54) INFORMATION PROCESSING SYSTEM AND INFORMATION PROCESSING METHOD

(71) Applicant: NINTENDO CO., LTD., Kyoto (JP)

(72) Inventors: Aya Kyogoku, Kyoto (JP); Kotaro Hiromatsu, Kyoto (JP); Kazuyoshi Sensui, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 27 days.

(21) Appl. No.: 15/690,675

(22) Filed: Aug. 30, 2017

(65) Prior Publication Data

US 2018/0078855 A1 Mar. 22, 2018

(30) Foreign Application Priority Data

Sep. 16, 2016 (JP) ................. 2016-181778

(51) Int. Cl.
| | |
|---|---|
| *A63F 9/24* | (2006.01) |
| *A63F 13/00* | (2014.01) |
| *G06F 17/00* | (2019.01) |
| *A63F 13/352* | (2014.01) |
| *A63F 13/30* | (2014.01) |
| *A63F 13/69* | (2014.01) |
| *A63F 13/798* | (2014.01) |
| *A63F 13/335* | (2014.01) |

(Continued)

(52) U.S. Cl.
CPC ............ *A63F 13/352* (2014.09); *A63F 13/30* (2014.09); *A63F 13/335* (2014.09); *A63F 13/69* (2014.09); *A63F 13/73* (2014.09); *A63F 13/79* (2014.09); *A63F 13/798* (2014.09); *A63F 2300/204* (2013.01); *A63F 2300/407* (2013.01); *A63F 2300/5553* (2013.01); *A63F 2300/57* (2013.01)

(58) Field of Classification Search
CPC ........ A63F 13/30; A63F 13/323; A63F 13/33; A63F 13/35
See application file for complete search history.

(56) References Cited

U.S. PATENT DOCUMENTS

| | | | | |
|---|---|---|---|---|
| 2003/0228901 | A1* | 12/2003 | Walker .................... | G07F 17/32 463/25 |
| 2004/0127284 | A1* | 7/2004 | Walker .................... | G07F 17/32 463/30 |

(Continued)

FOREIGN PATENT DOCUMENTS

JP 2012-55534 3/2012

OTHER PUBLICATIONS

Extended European Search Report dated Feb. 7, 2018 issued in European Application No. 17188289.7 (6 pgs.).

(Continued)

*Primary Examiner* — Kang Hu
*Assistant Examiner* — Jason Pinheiro
(74) *Attorney, Agent, or Firm* — Nixon & Vanderhye, P.C.

(57) ABSTRACT

An example of an information processing system includes a plurality of game machines, a smartphone, and a server system. Game processing is performed in the game machines, and information based on the game processing is transmitted to the server system. The server system totalizes the information transmitted from the respective game machines, and transmits a totalization result to the smartphone. In the smartphone, the received totalization result is displayed on a screen.

19 Claims, 18 Drawing Sheets

(51) Int. Cl.
　　　*A63F 13/73*　　　(2014.01)
　　　*A63F 13/79*　　　(2014.01)

(56) References Cited

U.S. PATENT DOCUMENTS

2009/0042644 A1* 2/2009 Zielinski ............... G07F 17/32
　　　　　　　　　　　　　　　　　463/27
2012/0066334 A1　 3/2012 Morimura et al.

OTHER PUBLICATIONS

Anonymous: "The Free GTAV IFRUIT and Game Manual Companion Apps", Sep. 16, 2013, XP055436253, retrieved from the internet: https://www.rockstargames.com/newswire/article/51371/the-free-gtav-ifruit-and-game-manual-companion-apps.html, retrieved on Dec. 18, 2017 (4 pgs.).
Anonymous: "PS4 Version of 'SingStar' Uses the Player's Smartphone for the Microphone | High-Def Digest", May 25, 2014, XP055437108, retrieved from the internet: https://web.archive.org/web/20140525075507/https://www.highdefdigest.com/news/show/games/singstar/Sony/Playstation/PS4/ps4-version-of-singstar-uses-the-players-smartphone-for-the-microphone/15134, retrieved on Dec. 20, 2017 (2 pgs.).
Pokemon Omega Ruby and Alpha Sapphire Official Guidebook Complete Story Strategy Guide, Overlap, Inc., Nov. 22, 2014, first edition, pp. 664 to 674.
Notice of Reasons for Refusal dated Oct. 22, 2020 in Japanese Patent Application No. 2016-181778 (with translation).

* cited by examiner

SMARTPHONE SCREEN (REFER TO USER DATA ON SERVER)

PRESENT GAME STATE OF GAME MACHINE 3

COMMON INFORMATION (VALUE OF VILLAGE)
5000

USER INFORMATION (AMOUNT OF SAVED MONEY)
30

INFORMATION PROCESSING SYSTEM AND INFORMATION PROCESSING METHOD

CROSS REFERENCE TO RELATED APPLICATION

The disclosures of Japanese Patent Application No. 2016-181778, filed on Sep. 16, 2016, are incorporated herein by reference.

FIELD

The exemplary embodiment relates to an information processing system including: a terminal that executes an application; and a server that performs communication with the terminal.

BACKGROUND AND SUMMARY

Conventionally, there has been an information processing system that stores, in a server, data to be used in an application executed in an information processing apparatus at a terminal side.

In the information processing system described above, improvement of the convenience and/or the interest of an application used in the terminal is desired.

Therefore, an object of the exemplary embodiment is to provide an information processing system, etc. that allow improvement of the convenience and/or the interest of an application used in a terminal.

To achieve the above object, the exemplary embodiment employs the following configurations.

An example of the exemplary embodiment is directed to an information processing system including a plurality of information processing apparatuses of a first type, an information processing apparatus of a second type different from the first type, and a server system. Each of the information processing apparatuses of the first type performs game processing, and a first transmission process of transmitting information based on the game processing to the server system. The server system performs a first reception process of receiving the information transmitted from each information processing apparatus of the first type, a totalization process of performing a totalization process of totalizing the information received by the first reception process, and a second transmission process of transmitting a totalization result of the totalization process to the information processing apparatus of the second type. The information processing apparatus of the second type performs a second reception process of receiving the totalization result transmitted from the server system, and information processing different from the game processing, by using the totalization result received by the second reception process.

According to the above, the information based on the game processing performed in the plurality of information processing apparatuses of the first type can be totalized in the server system, and the totalization result can be transmitted to the information processing apparatus of the second type different from the first type. Accordingly, for example, linkage can be made between information processing apparatuses of different types, and the convenience and/or the interest of an application used in each information processing apparatus can be improved.

In another configuration, each information processing apparatus of the first type may perform the game processing on the basis of an input of a user. Each information processing apparatus of the first type may transmit information based on the game processing performed on the basis of the input of the user, in the first transmission process.

According to the above, the information based on the game processing performed on the basis of the input of the user in each of the plurality of information processing apparatuses of the first type can be totalized and transmitted to the information processing apparatus of the second type.

In another configuration, each information processing apparatus of the first type may perform a counting process as the game processing. Each information processing apparatus of the first type may transmit a counting result of the counting process as the information based on the game processing, in the first transmission process. The server system may receive the counting result transmitted from each information processing apparatus of the first type, in the first reception process. The server system may totalize the counting result received by the first reception process, in the totalization process.

According to the above, the counting process can be performed in each information processing apparatus of the first type, the results of the counting process performed in the plurality of information processing apparatuses of the first type can be totalized in the server system, and the totalization result can be transmitted to the information processing apparatus of the second type.

In another configuration, each information processing apparatus of the first type may perform the counting process on the basis of a predetermined motion of an object in a virtual space, as the game processing.

According to the above, the counting process can be performed on the basis of the motion of the object in the virtual space in each information processing apparatus of the first type, and the result of the counting process performed on the basis of the predetermined motion in each information processing apparatus of the first type can be totalized in the server system.

In another configuration, the server system may perform a privilege grant process of granting a privilege to each information processing apparatus of the first type when a value of the totalization result exceeds a predetermined value.

According to the above, the privilege can be granted to each information processing apparatus of the first type, and thus the user of each information processing apparatus of the first type can be motivated to transmit the information based on the game processing.

In another configuration, the privilege may be at least one of an item, a character, an image, and a sound that are usable in each information processing apparatus of the first type, currency used in a predetermined game, and a stage in a predetermined game.

According to the above, an item, a character, an image, a sound, currency, a stage, or the like can be given as the privilege to each information processing apparatus of the first type.

In another configuration, the server system may perform a second privilege grant process of granting a privilege to the information processing apparatus of the second type when a value of the totalization result exceeds a predetermined value.

According to the above, the privilege can be granted to the information processing apparatus of the second type.

In another configuration, the privilege may be at least one of an item, a character, an image, and a sound that are usable in the information processing apparatus of the second type, currency used in a predetermined game, and a stage in a predetermined game.

According to the above, an item, a character, an image, a sound, currency, a stage, or the like can be given as the privilege to the information processing apparatus of the second type.

In another configuration, each information processing apparatus of the first type may perform a selection process of selecting a predetermined object in the game processing. Each information processing apparatus of the first type may transmit a selection result by the selection process as the information based on the game processing, in the first transmission process. The server system may receive the selection result transmitted from each information processing apparatus of the first type, in the first reception process. The server system may totalize the selection result received by the first reception process, in the totalization process.

According to the above, the selection result of the object in each of the plurality of information processing apparatuses of the first type can be totalized, and the totalization result can be transmitted to the information processing apparatus of the second type.

In another configuration, the information processing system may perform a usable process of making an object corresponding to the totalization result, usable in the information processing apparatus of the second type.

According to the above, the selection result of the object in each of the plurality of information processing apparatuses of the first type can be totalized, and the object can be made usable in the information processing apparatus of the second type on the basis of the totalization result.

In another configuration, each information processing apparatus of the first type may exclude the object made usable in the information processing apparatus of the second type from objects to be selected in the selection process, in the game processing.

According to the above, the object made usable in the information processing apparatus of the second type can be excluded from the objects to be selected.

In another configuration, each information processing apparatus of the first type may set a specific parameter in a game by the game processing on the basis of an input of the user, in the game processing. The server system may receive the specific parameter transmitted from each information processing apparatus of the first type, in the first reception process. The server system may totalize the specific parameter received by the first reception process, in the totalization process.

According to the above, the specific parameters in the game in the plurality of information processing apparatuses of the first type can be totalized, and the totalization result can be transmitted to the information processing apparatus of the second type.

In another configuration, the information processing apparatus of the second type may perform game processing different from the game processing performed in each information processing apparatus of the first type, as the information processing.

According to the above, the processing different from the game processing can be performed on the basis of the totalization result in the information processing apparatus of the second type.

In another configuration, each information processing apparatus of the first type may be a game apparatus, and the information processing apparatus of the second type may be a smart device.

According to the above, linkage can be made between the game apparatus and the smart device. Here, the smart device means a multifunctional information terminal such as a smartphone, a table, and a watch-type or glasses-type wearable terminal.

In another configuration, each information processing apparatus of the first type may include a first communication section, and the information processing apparatus of the second type may include a second communication section different from the first communication section. The second communication section may be a communication section connectable to a WAN.

According to the above, linkage can be made between information processing apparatuses having different communication sections.

In another configuration, each information processing apparatus of the first type may include a first operation section including a plurality of physical buttons for performing the game processing. In addition, the information processing apparatus of the second type may include a second operation section different from the first operation section.

According to the above, linkage can be made between information processing apparatuses having different operation sections.

In another configuration, the server system may perform the totalization process every time the information is transmitted from the information processing apparatus of the first type.

According to the above, every time the information is transmitted from the information processing apparatus of the first type, the totalization process of the information can be performed, and the information can be totalized in real time.

In another configuration, the server system may perform the totalization process at predetermined time intervals.

According to the above, the totalization process can be performed at the predetermined time intervals, and, for example, a load on the server system can be reduced as compared to that in the case where the totalization process is performed in real time.

Another example of the exemplary embodiment is directed to an information processing method performed in an information processing system including a plurality of information processing apparatuses of a first type, an information processing apparatus of a second type different from the first type, and a server system. In the information processing method, each information processing apparatus of the first type executes a game processing step of performing game processing, and a first transmission step of transmitting information based on the game processing to the server system. In addition, the server system executes a first reception step of receiving the information transmitted from each information processing apparatus of the first type, a totalization step of performing a totalization process of totalizing the information received in the first reception step, and a second transmission step of transmitting a totalization result of the totalization process to the information processing apparatus of the second type. Moreover, the information processing apparatus of the second type executes a second reception step of receiving the totalization result transmitted from the server system, and an information processing step of performing information processing different from the game processing, by using the totalization result received in the second reception step.

According to the above, the convenience and/or the interest of an application used in a terminal can be improved.

These and other objects, features, aspects and advantages of the exemplary embodiment will become more apparent from the following detailed description when taken in conjunction with the accompanying drawings.

DETAILED DESCRIPTION OF NON-LIMITING EXAMPLE EMBODIMENTS

[1. Entire Configuration of System]

Figure 1:
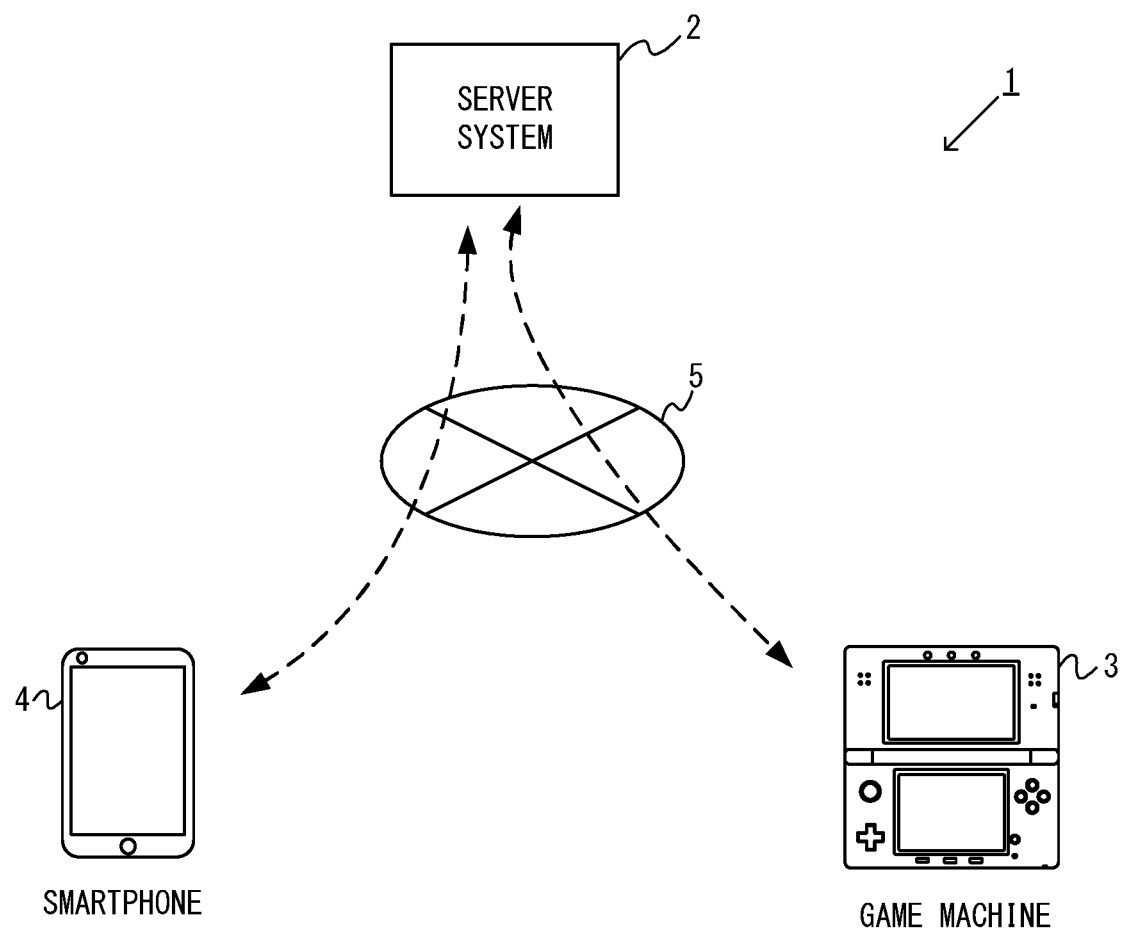
FIG. 1 is an example non-limiting diagram showing an example of the configuration of an information processing system 1 according to an embodiment.

Hereinafter, an information processing system according to an embodiment will be described with reference to the drawings. First, the entire configuration of the information processing system according to the present embodiment and each terminal included in the information processing system will be described. FIG. 1 is a diagram showing an example of the configuration of an information processing system 1 according to the present embodiment. As shown in FIG. 1, the information processing system 1 includes a server system 2, a game machine 3, and a smartphone 4. The server system 2, the game machine 3, and the smartphone 4 are connectable to a network 5 such as the internet including a mobile communication network.

The server system 2 is connected to the internet via a wire or wirelessly. The server system 2 includes at least one CPU and a memory and is capable of executing a predetermined information processing program. The server system 2 may be composed of a plurality of server apparatuses or may be composed of a single server apparatus.

The game machine 3 is, for example, a portable game apparatus. The game machine 3 is an information processing apparatus having a size small enough to be held with both hands or one hand of a user, and includes various buttons for game operations. The game machine 3 has a function to connect to a wireless LAN and is capable of communicating with the server system 2 on the internet via the wireless LAN. In addition, the game machine 3 is capable of executing an application for the game machine 3 (hereinafter, referred to as "game machine application"), and is capable of executing a game application as the game machine application. In addition to the game application, the game machine 3 may be capable of executing any other application (e.g., a Web browser, a mailer, an application for creating/editing a document, an application for reproducing or capturing a still image or a moving image, etc.). The game machine 3 may be a stationary game apparatus.

The smartphone 4 has, for example, a size small enough to be held with one hand or both hands of a user, and is an information processing apparatus of a type different from the game machine 3. The smartphone 4 is an example of a smart device. Here, the "smart device" means a multifunctional information terminal including a smartphone, a tablet, and an information processing apparatus capable of being worn by a user (a so-called wearable terminal) such as a watch-type or glasses-type terminal. Here, the multifunctional information terminal may have a function to execute an application (e.g., a browser, a mailer, a game application, etc.), a function to output an image (a still image or a moving image) and sound, a network communication function (e.g., a function to perform a communication via a wireless LAN, a function to perform communication via a mobile communication network, etc.), etc. In addition to the above functions, the multifunctional information terminal may have a photographing function with a camera, a short-range wireless communication function (e.g., a function to perform communication by means of Bluetooth (registered trademark) or NFC (Near Field Communication)), a position detecting function (e.g., a GPS function), etc.

The smartphone 4 is connectable to a mobile communication network (in other words, a mobile phone communication network), and is capable of functioning as a mobile phone. The smartphone 4 is capable of executing an application for the smartphone 4 (hereinafter, referred to as "smartphone application"), and is capable of executing, for example, a game application. The smartphone 4 may be a smartphone in which an OS (operating system) such as Android (registered trademark) or iOS is installed.

FIG. 1 shows the one game machine 3 and the one smartphone 4, but the information processing system 1 according to the present embodiment includes a plurality of game machines 3 and a plurality of smartphones 4.

[2. Configuration of Each Apparatus]

Next, the configuration of each terminal included in the information processing system according to the present embodiment will be described with reference to FIGS. 2 and 3.

(Specific Example of Configuration of Game Machine)

Figure 2:
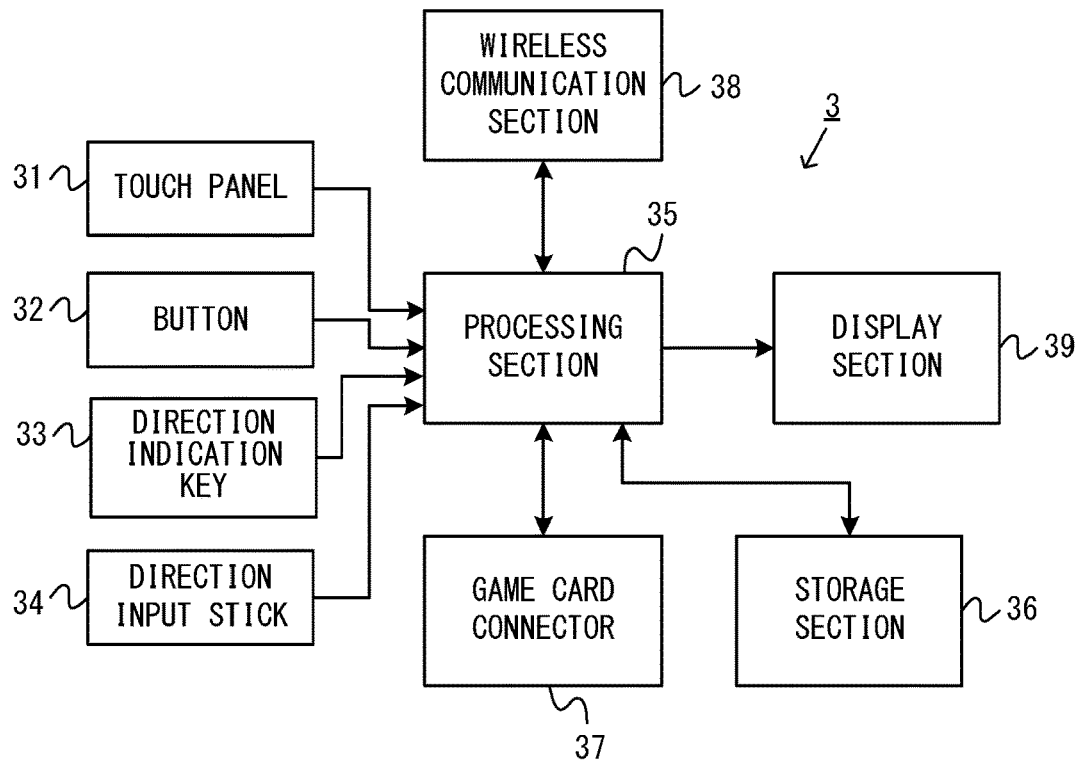
FIG. 2 is an example non-limiting block diagram showing an example of the configuration of a game machine 3.

FIG. 2 is a block diagram showing an example of the configuration of the game machine 3. As shown in FIG. 2, the game machine 3 includes a touch panel 31, a button 32, a direction indication key 33, and a direction input stick 34, as an example of an input section. In addition, the game machine 3 includes a display section 39. The game machine 3 may include a speaker, a microphone, and/or a camera, etc.

The touch panel 31 is provided on the screen of the display section 39. The display section 39 displays an image (e.g., a game image, etc.) generated by information processing performed by a processing section 35 of the game machine 3.

The button 32 is a physical button (also called a hardware button), and includes a button for performing an instruction for controlling the game machine 3 (e.g., turning on/off the power) and a plurality of buttons for performing an input instruction in an application (e.g., a game application) executed in the game machine 3. The button 32 is provided within a range where a finger of the right hand and/or the left hand of the user reaches the button 32 when the user holds the game machine 3 with both hands. For example, the button 32 may include a plurality of buttons disposed on a principal surface of a housing of the game machine 3 and a button provided on the upper surface of the game machine 3 (the number of such buttons may be one or more).

The direction indication key 33 is an example of an input section capable of performing a direction input regarding at least four directions, that is, up, down, right, and left, and is also called a cross key. The direction indication key 33 is used for performing a direction input in a game application executed in the game machine 3.

The direction input stick 34 is an example of the input section capable of performing a direction input regarding at least four directions, that is, up, down, right, and left. The direction input stick 34 is, for example, an analog stick or a slide stick (also called a slide pad). The direction input stick 34 includes a stick member that is inclinable (or slidable) in all directions parallel to the principal surface of the housing of the game machine 3 (that is, in 360° directions including up, down, right, left, and oblique directions). The user is allowed to perform an input of a direction corresponding to an inclination direction (and an input of a magnitude corresponding to an angle of inclination) by inclining (or sliding) the stick member. The direction input stick 34 is used, for example, for performing a direction input in a game application executed in the game machine 3.

For example, the screen of the display section 39 may be provided in a center region of the principal surface of the game machine 3, the button 32, the direction indication key 33, and the direction input stick 34 may be provided at the right side or the left side of the screen, and the button 32 may be also provided at the right side and the left side of the upper surface of the game machine 3. The user holding the right side and the left side of the game machine 3 with both hands is allowed to operate the button 32, the direction indication key 33, and the direction input stick 34 with the holding hands.

The game machine 3 includes a game card connector 37. The game card connector 37 is a connector for connecting to a game card attached to the game machine 3. Here, the game machine 3 includes a slot to which a dedicated game card for the game machine 3 is detachably attachable. The "dedicated game card" means a storage medium that is attachable to the game machine 3 and cannot be attached to an apparatus of a different type from the game machine 3 (at least to the smartphone 4). The game card attached to the slot is connected to the game card connector 37 and becomes accessible by the processing section 35 of the game machine 3. The game card can store therein, for example, a program executable in the game machine 3 (e.g., a program of a game application) and/or data to be used in a program executed in the game machine 3 (e.g., game data to be used in a game application).

The game machine 3 includes the processing section 35 and a storage section 36. The processing section 35 is electrically connected to each of the sections 31 to 34 and 36 to 39 of the game machine 3. The processing section 35 includes a CPU (Central Processing Unit) and a memory. In the game machine 3, by the CPU using the memory to execute a program stored in the storage section 36 and/or a program stored in the game card attached to the game machine 3, various types of information processing are executed. The storage section 36 is, for example, a nonvolatile memory, and stores therein a program to be executed in the processing section 35, data to be used in information processing by the processing section 35, data obtained by the information processing, user data specific to the user, and the like.

The game machine 3 includes a platform for executing an application. The platform of the game machine 3 refers to a configuration that is implemented by: hardware (i.e., a CPU, etc.) forming the processing section 35; and an OS stored in the storage section 36 and that is for executing an application. In the present embodiment, the platform of the game machine 3 is a platform for which an OS dedicated for the game machine 3 is used. An application stored in the storage section 36 or the game card is executed on the platform.

The game machine 3 includes a wireless communication section 38 having a function to perform communication with another apparatus via the network 5. The wireless communication section 38 is, for example, a communication module approved by the Wi-Fi Alliance, and may be connectable to a wireless LAN. The wireless communication section 38 performs wireless communication with a wireless LAN access point. The game machine 3 connects to the network 5 via the wireless LAN access point and performs communication with another apparatus (e.g., the server system 2, etc.). The range where wireless communication using the wireless communication section 38 is enabled is, for example, several tens to several hundreds of meters. The wireless communication between the wireless communication section 38 and the wireless LAN access point is performed by so-called CSMA/CA (Carrier Sense Multiple Access/Collision Avoidance).

The configuration of the communication section for the game machine 3 to perform communication via the network 5 may be any configuration. In addition, the game machine 3 may include a short-range communication section having a function to perform short-range wireless communication with an apparatus present around the game machine 3 (e.g., a game machine of the same type as the game machine 3, or an apparatus of another type). The short-range communication section may be, for example, a communication module that performs communication based on the standards of Bluetooth (registered trademark), or may be a communication module that performs infrared communication. In another embodiment, the game machine 3 may include a mobile communication section that connects to a mobile communication network and performs communication, similarly to the smartphone 4.

In addition to the configuration shown in FIG. 2, the game machine 3 may have another configuration. For example, the game machine 3 may have a function to perform communication by means of NFC and/or a function to detect the position of the game machine 3 (e.g., a GPS function), etc.

(Specific Example of Configuration of Smartphone)

Figure 3:
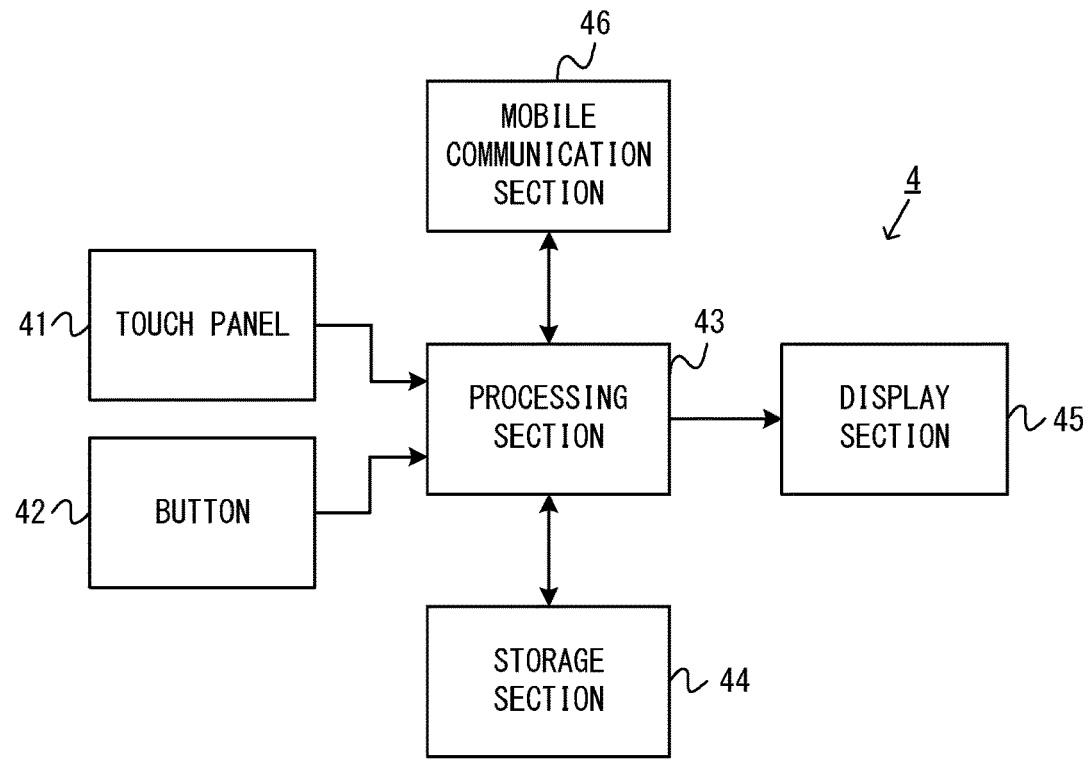
FIG. 3 is an example non-limiting block diagram showing an example of the configuration of a smartphone 4.

FIG. 3 is a block diagram showing an example of the configuration of the smartphone 4. As shown in FIG. 3, the smartphone 4 includes a touch panel 41 and a button 42, as an example of an input section. In addition, the smartphone 4 includes a display section 45. The touch panel 41 is provided on the screen of the display section 45. The display section 45 displays an image generated by information processing executed in a processing section 43 of the smartphone 4 (e.g., an image of an application, etc.). The button 42 may be, for example, a button for displaying a home screen. In addition, the button 42 may be used for switching between On and Off of the power of the smartphone 4 or switching between On and Off of screen display on the display section 45. In addition to the above, the smartphone 4 may include a speaker, a microphone, and/or a camera, etc.

The smartphone 4 includes the processing section 43 and a storage section 44. The processing section 43 is electrically connected to each of the sections 41, 42, and 44 to 46 of the smartphone 4. The processing section 43 includes a CPU and a memory. In the smartphone 4, by the CPU using the memory to execute a program stored in the storage section 44, various types of information processing are executed. The storage section 44 is, for example, a nonvolatile memory, and stores therein a program to be executed in the processing section 43, data to be used in information processing by the processing section 43, data obtained by the information processing, and the like.

The smartphone 4 includes a platform for executing an application. Here, the platform of the smartphone 4 refers to a configuration that is implemented by: hardware (i.e., a CPU, etc.) forming the processing section 43; and an OS (operating system. Also called a system program) stored in the storage section 44 and that is for executing an application. In the present embodiment, the platform of the smartphone 4 is a platform for which an OS such as Android (registered trademark) or iOS is used. An application program stored in the storage section 44 is executed on the platform.

The smartphone 4 includes a mobile communication section 46 that connects to a mobile communication network (in other words, a mobile phone communication network) and performs communication. In the present embodiment, the smartphone 4 performs communication with another apparatus (e.g., the server system 2, etc.) by connecting to the network 5 using the mobile communication section 46 (via the mobile communication section 46). The mobile communication section 46 performs wireless communication with a base station of a telecommunications carrier. The communication between the mobile communication section 46 and the base station is performed by a method different from that for the wireless LAN. The range where the communication between the mobile communication section 46 and the base station is enabled is wider than that for communication using the wireless communication section 38 of the game machine 3, and is, for example, several hundreds of meters to several kilometers. The configuration of the communication section for the smartphone 4 to perform communication via the network 5 may be any configuration. The smartphone 4 may include other communication means different from the mobile communication section 46. For example, the smartphone 4 may have a function to connect to a wireless LAN by a communication module approved by the Wi-Fi alliance.

In addition to the configuration shown in FIG. 3, the smartphone 4 may have another configuration. For example, the smartphone 4 may have a function to perform communication by means of NFC and/or a function to detect the position of the smartphone 4 (e.g., a GPS function), etc.

(Differences Between Game Machine 3 and Smartphone 4)

As described above, the game machine 3 and the smartphone 4 are information processing apparatuses of types different from each other. Specifically, the game machine 3 and the smartphone 4 are different from each other in the following points, and thus can be considered as information processing apparatuses of different types.

First, the game machine 3 and the smartphone 4 are different from each other in a platform for executing an application. That is, the smartphone 4 has an OS for executing a general-purpose application as well as a game application, such as Android (registered trademark) or iOS. On the other hand, the game machine 3 is capable of executing an application other than a game application, but has an OS more suitable for executing a game application. The smartphone 4 has compatibility with a smartphone application but does not have compatibility with a game machine application. In addition, the game machine 3 has compatibility with a game machine application but does not have compatibility with a smartphone application.

The game machine 3 and the smartphone 4 are also different from each other in that, whereas the smartphone 4 has a function to perform communication via a mobile communication network (can be also referred to as call function via a mobile communication network), the game machine 3 does not have such a function. That is, the smartphone 4 has a function to directly connect to a wide area communication network (WAN), but the game machine 3 does not have such a function. Here, the wide area communication network (WAN) is a network over a wider area than a LAN (Local Area Network) and means a network in a relatively wide area including a mobile communication network (in other words, a mobile phone communication network).

The game machine 3 includes various input sections suitable for game operations (the button 32 including a plurality of buttons, the direction indication key 33, the direction input stick 34, etc.). Specifically, the button 32 as an example of the input section of the game machine 3 includes a plurality of buttons, and, for example, while the user is operating a certain button with their thumb, the user can operate another button with their index finger or middle finger. In addition, the game machine 3 is configured such that, for example, while the user is operating the button 32 with the thumb and the index finger (or the middle finger) of their right hand, the user can operate the direction indication key 33 or the direction input stick 34 with the thumb of their left hand. On the other hand, the smartphone 4 does not have such input sections. The smartphone 4 does not have at least the direction input stick 34. In addition, the number of the buttons of the smartphone 4 is smaller than that of the game machine 3.

That is, since the game machine 3 includes the input sections for game operations and thus is an information processing apparatus suitable for games, the game machine 3 can be considered as an information processing apparatus for games. The game machine 3 and the smartphone 4 are different from each other in that, whereas the smartphone 4 is a general-purpose information processing apparatus (in other words, a multifunctional information terminal), the game machine 3 is an information processing apparatus for games. As described above, the game machine 3 is an information processing apparatus for games, but is not necessarily useable only for games. For example, the game machine 3 may have a browser function by a browser application being installed thereinto, may have a moving image reproduction function by a moving image reproduction application being installed thereinto, or may have a photographing function by including a camera.

The game machine 3 and the smartphone 4 are also different from each other in that, whereas the game machine 3 allows a dedicated game card to be attached thereto, the smartphone 4 does not allow the game card to be attached thereto.

In the present embodiment, between the game machine 3 and the smartphone 4, there are at least four differences in OS, communication means, input section, and whether a dedicated game card is attachable. However, if there is at least one of these four differences, two information processing apparatuses can be considered as information processing apparatus of different types. That is, in another embodiment, between two types of information processing apparatuses that are the terminal apparatuses in the information processing system, at least one of the above four differences only needs to be present. For example, the game machine 3 may have a function to perform communication via a mobile communication network, or may not necessarily allow a dedicated game card to be attached thereto.

[3. Description of Information Processing System]

(Outline of Information Processing System)

Figure 4:
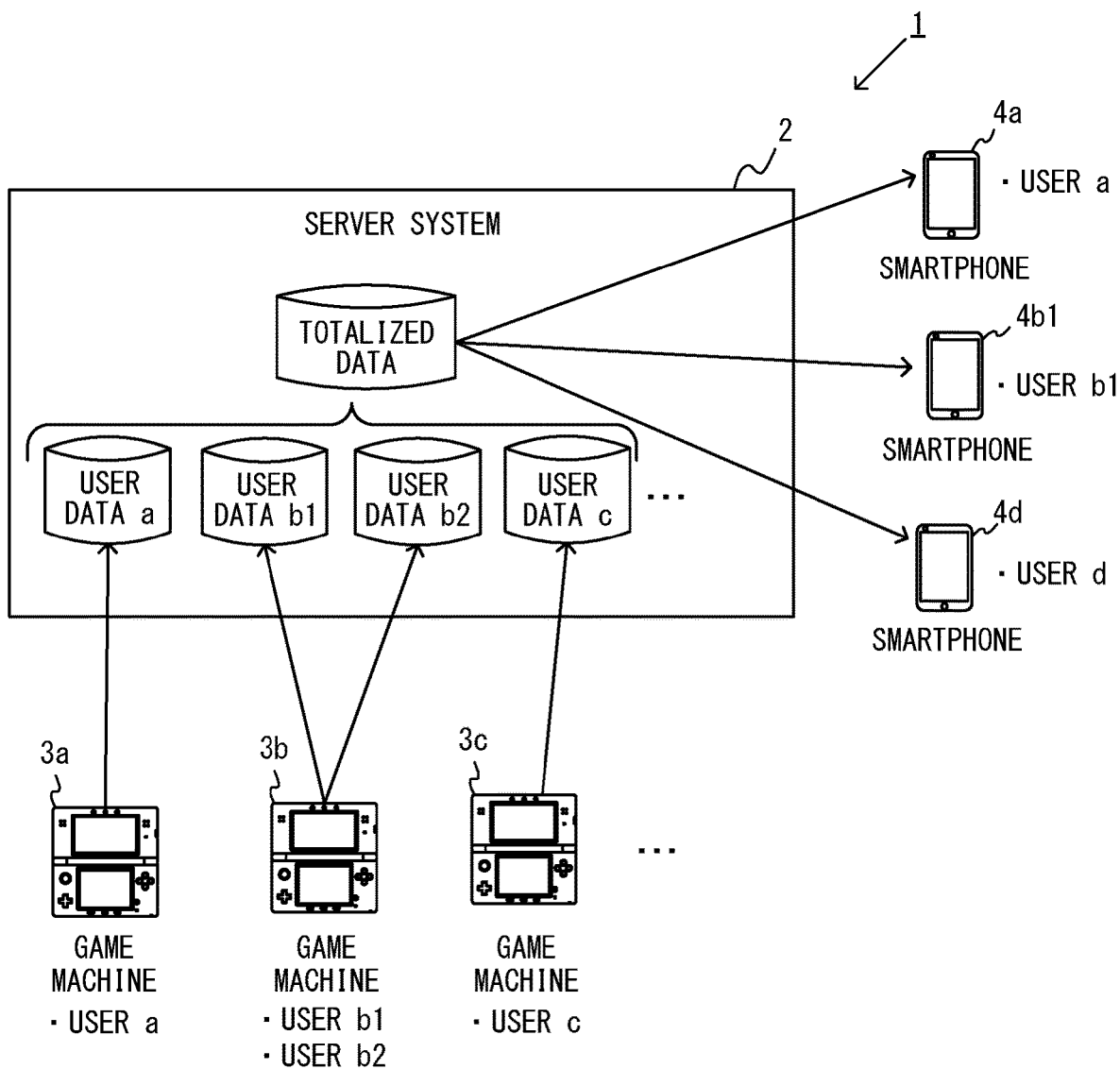
FIG. 4 is an example non-limiting diagram showing an outline of the information processing system 1.

FIG. 4 is a diagram showing an outline of the information processing system 1. The information processing system 1 shown in FIG. 4 includes game machines 3a, 3b, and 3c as the game machines 3. The game machine 3a is used by a user a, the game machine 3b is used by users b1 and b2, and the game machine 3c is used by a user c. In addition, the information processing system 1 includes smartphones 4a, 4b1, and 4d as the smartphones 4. The smartphone 4a is used by the user a, the smartphone 4b1 is used by the user b1, and the smartphone 4d is used by a user d.

The respective "users" correspond to different persons. That is, the user a corresponds to a person A, the user b1 corresponds to a person B1, the user b2 corresponds to a person B2, the user c corresponds to a person C, and the user d corresponds to a person D.

Here, in each game machine 3, user data generated by the same game application (hereinafter, referred to as "game machine application A") being executed is stored. The "user data" is information based on game processing performed in the game machine 3. The user data includes data indicating a value of a predetermined parameter in a game of the game machine application A. Hereinafter, the game performed by the game machine 3 executing the game machine application A is referred to as "game A".

Prior to description of the outline of the system shown in FIG. 4, a game performed in each terminal and data stored in each terminal will be described.

For example, in the game A executed in the game machine 3, a character of the user (hereinafter, referred to as "player character") moves or makes a predetermined motion within a virtual space called "village". For example, the player character interacts with animal characters living in the "village" and develops the village, thereby developing their own village. As the village develops, the value of the village increases, and a privilege is obtained in the game A. In addition, the player character gains money used in the game A (currency in the game) or purchases an item with the gained money, by making a predetermined motion. Moreover, in the game A, an event is held at a predetermined time. Each game machine 3 includes an RTC for counting date and time. For example, the event is held in each game machine 3 when a predetermined period (e.g., January 1 to 3) has come. For example, as the event, a "fishing event" is held. In the "fishing event", the user operates the player character to do fishing in the game. For example, various privileges are obtained within the game A, depending on the number or the types of fish caught. For example, the player character can obtain money used in the game A, as an example of a privilege.

In the game A, one "village" is formed in a single game machine 3. When one user uses the game machine 3, a player character of the user is present in the "village", and other characters such as animals present in the "village" are non-player characters (hereinafter, referred to merely as "characters") controlled by the game machine 3.

Meanwhile, when a plurality of users use a single game machine 3, if a "village" is formed by the first user, the second and subsequent users cannot form their own "village" and play the game as "residents" in the village formed by the first user. That is, in the game A executed in the game machine 3 used by the plurality of users, the player character corresponding to the first user and player characters corresponding to the second and subsequent users are present in the same "village". In the game machine 3 used by the plurality of users, user data is stored for each user, and each user data is different for each user. For example, the game machine 3b shown in FIG. 4 is used by the user b1 and the user b2, and user data b1 for the user b1 and user data b2 for the user b2 are stored therein. Meanwhile, since the characters of the respective users are present in the same "village", information regarding the village (the types and the number of non-player characters, etc.) are common.

Figure 5:
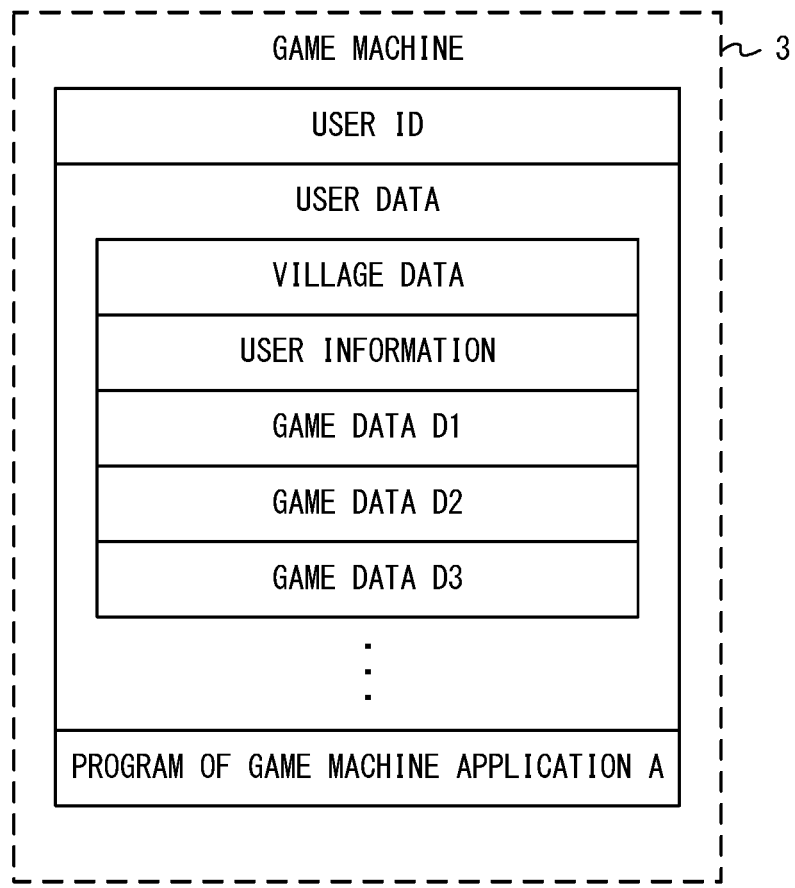
FIG. 5 is an example non-limiting diagram showing an example of data stored in a storage section 36 and a memory card of the game machine 3.

FIG. 5 is a diagram showing an example of data stored in the storage section 36 and the memory card of the game machine 3. As shown in FIG. 5, user ID and user data are stored in the storage section 36 of the game machine 3. In addition, a program of the game machine application A is stored in the memory card of the game machine 3.

The user ID is identification information for identifying a user and is uniquely assigned to the user. The user ID includes identification information of a "village" that is common to each user of the game machine 3, and individual identification information of the user. The identification information of the "village" is randomly determined in each game machine 3.

The user data includes "village data", "user information", "game data D1", "game data D2", and "game data D3". In addition to the game data D1 to D3, game data indicating many parameters in the game A is stored in the storage section 36 of the game machine 3.

The "village data" is data common to each user when a plurality of users have been registered in the game machine 3. The village data is data indicating information regarding the village. The village data may be, for example, information indicating the value of the present village (this information changes in accordance with time) and information regarding characters living in the village (e.g., the birthdays and the like of the characters).

The "user information" is information regarding a user. The user information is, for example, information such as the user name and the birthday of the user, and is information that is set by the user.

The game data D1 to D3 are game parameters that change by a player character making a predetermined motion. For example, the game data D1 is data indicating an amount of saved money of the player character. The game data D2 is data indicating the number and the types of fish caught by the player in the above fishing event. The game data D2 is data used in a specific period in which the fishing event is held, but the game data D1 is data used permanently not only in the specific period but also in a period in which the game A is performed. The game data D3 is data indicating votes for a later-described character (in other words, selection of the character).

The user information and the game data D1 to D3 are data different for each user, and are not information common to each user of a single game machine 3 like the village data.

In addition to the data shown in FIG. 5, various data for performing the above game A are stored in the game machine 3. In the game machine 3, the above game A is performed by using these various data.

Figure 6:
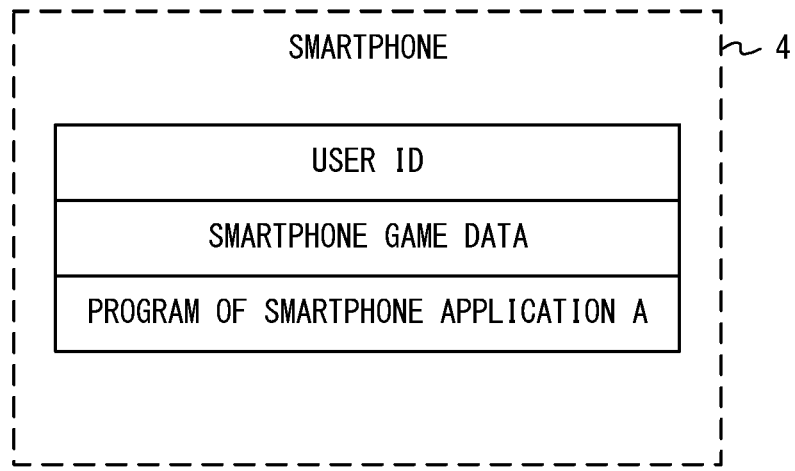
FIG. 6 is an example non-limiting diagram showing an example of data stored in the smartphone 4.

FIG. 6 is a diagram showing an example of data stored in the smartphone 4. As shown in FIG. 6, user ID, smartphone game data, and a program of a smartphone application A are stored in the storage section 44 of the smartphone 4.

The user ID is information for identifying a user of a game application executed in the smartphone 4 (hereinafter, referred to as "smartphone application A"). Basically, the smartphone 4 is not used by a plurality of users like the game machine 3, and is used by a single user. Therefore, one user ID is stored in the smartphone 4.

The smartphone game data is data used in a game performed by executing the smartphone application A (hereinafter, referred to as "smartphone game A"). The smartphone game data includes, for example, data of characters.

The program of the smartphone application A is an application program to be executed in the smartphone 4. The program of the smartphone application A is a program different from the program of the game machine application A and is executed on the smartphone 4.

The smartphone game A is a trial version game of the game A to be performed in the game machine 3. The smartphone game A has a portion common to the game A in the game machine 3 (e.g., characters appearing in the game in the game machine 3), but is a game made simpler than the game A in the game machine 3. The smartphone game A may not be the trial version of the game A to be performed in the game machine 3. For example, the smartphone game A may be a game that is exactly the same as the game A to be performed in the game machine 3, or may be a game that is similar to the game A to be performed in the game machine 3 but is different in specifications therefrom, for example, a game that is a game obtained by adding a new function (e.g., a stage, a character, an item, etc.) to the game A in the game machine 3, or a game having functions partially different from those of the game A. In addition, the smartphone game A may be a game that is totally different from the game A to be performed in the game machine 3. For example, even in the case where the smartphone game A and the game A in the game machine 3 are totally different from each other, these games may have a common portion (e.g., characters, items, etc.).

Referring back to FIG. 4, the outline of the information processing system 1 will be described. In the present embodiment, as shown in FIG. 4, each game machine 3 accesses the server system 2 and uploads the user data stored in each game machine 3, to the server system 2. For example, during execution of the game A, the game machine 3 connects to the server system 2 via the network 5 at a predetermined time and transmits the user data stored in the storage section 36, to the server system 2. For example, the game machine 3 may upload the user data to the server system 2 at the time of a shift from a certain scene to another scene in the game A. In addition, the game machine 3 may upload the user data stored in the storage section 36, to the server system 2 at a time at which the game machine 3 connects to a wireless LAN. In addition, while the game A is not executed, the game machine 3 may connect to the server system 2 and upload the user data regarding the game A to the server system 2. Moreover, the game machine 3 may upload the user data to the server system 2 in accordance with an instruction from the user.

In the server system 2, a user data storage area is provided for each user. For example, in the server system 2, a user data storage area for the user a, a user data storage area for the user b1, a user data storage area for the user b2, and a user data storage area for the user c are provided. In addition to these areas, in the server system 2, a user data storage area is provided for each of the users of the game machines 3.

When the server system 2 receives the user data from the game machine 3, the server system 2 stores the user data in the user data storage area for the corresponding user. For example, when the server system 2 receives user data a of the user a from the game machine 3a, the server system 2 stores the user data a in the user data storage area for the user a. In addition, for example, when the server system 2 receives the user data b1 of the user b1 from the game machine 3b, the sever system 2 stores the user data b1 in the user data storage area for the user b1.

As shown in FIG. 4, the server system 2 totalizes the user data stored in the user data storage areas for the respective users, and stores the resultant data as totalized data. For example, when the server system 2 receives the user data from the game machine 3, the server system 2 stores the received user data in the user data storage area, and also totalizes the respective user data and stores the resultant data as totalized data. In addition, at predetermined time intervals (e.g., once an hour), the server system 2 may totalize the respective stored user data and store the resultant data as totalized data.

Specifically, the server system 2 totalizes the same type of game data included in the respective user data (game data indicating the same parameter in the game A) and stores the resultant data as totalized data of the game data. For example, the server system 2 totalizes the game data D1 included in the respective user data, and stores the resultant data as totalized data of the game data D1. In addition, for example, the server system 2 totalizes the game data D2 included in the respective user data, and stores the resultant data as totalized data of the game data D2. For example, when the game data D1 is data indicating an amount of saved money of the player character, the server system 2 sums up the amounts of saved money indicated by the game data D1 of the respective user data, and stores the total amount of saved money as totalized data. Moreover, for example, when the game data D2 is data indicating the number of fish caused by the player character in the fishing event, the server system 2 sums up the numbers of fish indicated by the game data D2 of the respective user data, and stores the total number as totalized data.

The server system 2 transmits the stored totalized data to each smartphone 4. Specifically, when the server system 2 receives, from the smartphone 4, a request for acquiring the totalized data, the server system 2 transmits the totalized data to the smartphone 4. The smartphone 4 performs predetermined information processing by using the received totalized data. For example, the smartphone 4 displays the received totalized data on the display section 45.

Figure 7:
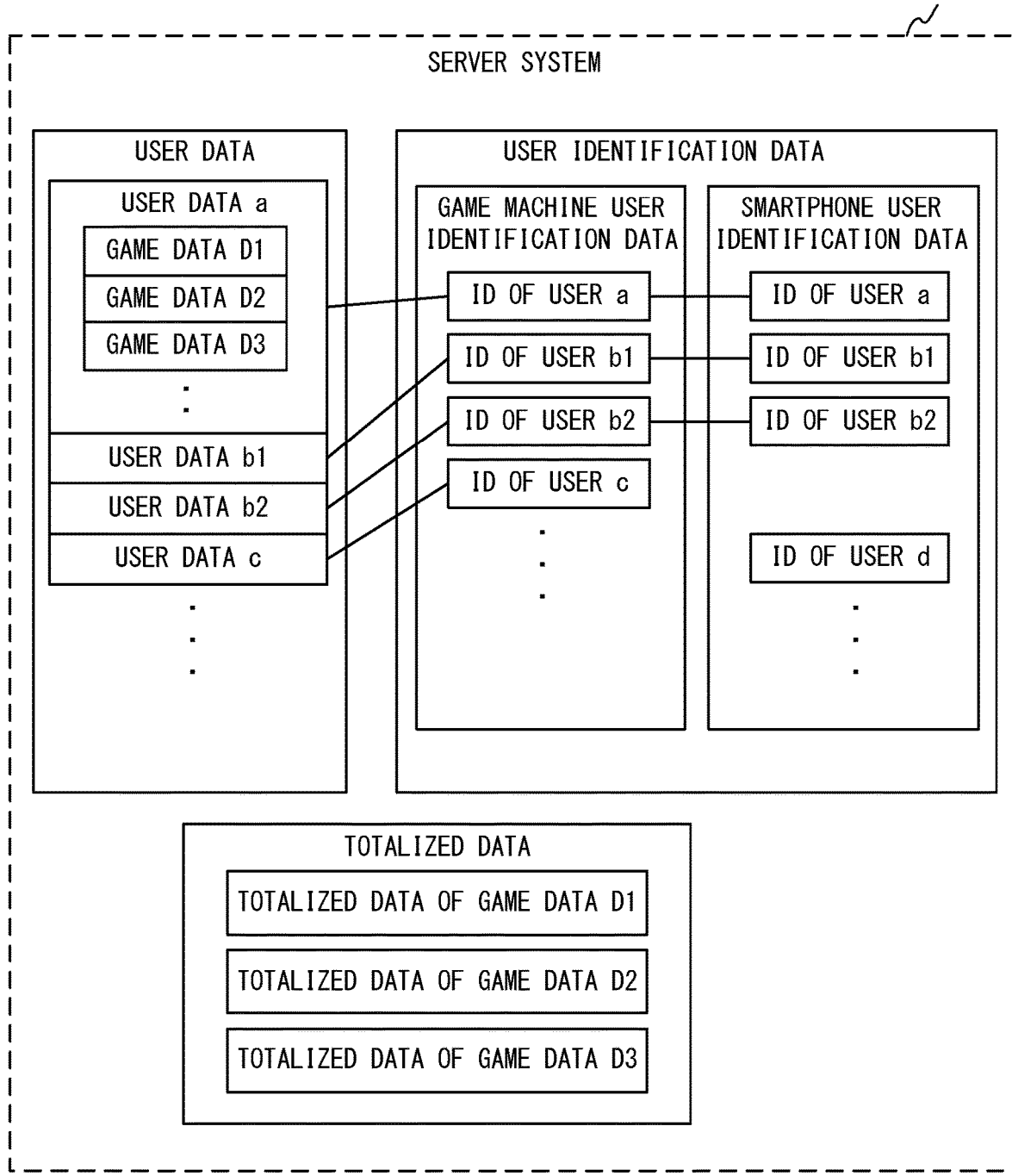
FIG. 7 is an example non-limiting diagram showing an example of data stored in a server system 2.

Here, data stored in the server system 2 will be described. FIG. 7 is a diagram showing an example of the data stored in the server system 2. As shown in FIG. 7, user data and user identification data are stored in the server system 2.

The user data is the aforementioned user data of each user. For example, the user data a, the user data b1, the user data b2, and user data c are stored as the user data in the server system 2. In addition to these use data, many user data are also stored in the server system 2.

The user identification data includes game machine user identification data and smartphone user identification data. The game machine user identification data is data indicating the user ID of the game machine 3 (the user ID in FIG. 5). For example, data indicating the user ID of the user a, data indicating the user ID of the user b1, data indicating the user ID of the user b2, and data indicating the user ID of the user c are stored as the game machine user identification data in the server system 2. In addition, the smartphone user identification data is data indicating the user ID of the smartphone 4 (the user ID in FIG. 6). For example, data indicating the user ID of the user a, data indicating the user ID of the user b1, data indicating the user ID of the user b2, and data indicating the user ID of the user d are stored as the smartphone user identification data in the server system 2.

As shown in FIG. 7, the user ID of the game machine 3 is associated with the user data. For example, the user ID of the user a of the game machine 3a is associated with the user data a. The user ID of the user b1 of the game machine 3b is associated with the user data b1. The user ID of the user b2 of the game machine 3b is associated with the user data b2. The user ID of the user c of the game machine 3c is associated with the user data c.

The user ID of the game machine 3 and the user ID of the smartphone 4 are different from each other as information, but may be associated with each other.

For example, as shown in FIG. 7, the user ID of the user a of the game machine 3a is associated with the user ID of the user a of the smartphone 4a. The user ID of the user b1 of the game machine 3b is associated with the user ID of the user b1 of the smartphone 4b1. In addition, the user ID of the user b2 of the game machine 3b is associated with the user ID of the user b2 of a smartphone 4b2. In the example shown in FIG. 7, the user ID of the user c of the game machine 3c is not associated with any of IDs of the respective users of the smartphones 4. In addition, the user ID of the user d of the smartphone 4d is not associated with any of user IDs of the respective users of the game machines 3.

As is obvious from the above, the person A is registered as the user a of the game machine 3a in the server system 2 and is registered as the user a of the smartphone 4a in the server system 2. The person B1 is registered as the user b1 of the game machine 3b in the server system 2 and is registered as the user b1 of the smartphone 4b1 in the server system 2. The person B2 is registered as the user b2 of the game machine 3b in the server system 2 and is registered as the user b2 of the smartphone 4b2 in the server system 2.

When the user ID of the game machine 3 is associated with the user ID of the smartphone 4, the person identified by the user ID can refer to the user data of their own game machine 3 stored in the server system 2, by accessing the server system 2 from their own smartphone 4.

Meanwhile, the person C is registered as the user c of the game machine 3c in the server system 2 but is not registered as the user of any smartphone 4 in the server system 2. For example, the person C can execute the game A in the game machine 3c, but cannot execute the smartphone game A since the person C does not have a smartphone 4 or since the smartphone application A is not installed in their own smartphone 4.

The person D is not registered as the user of any game machine 3 in the server system 2 but is registered as the user d of the smartphone 4d in the server system 2. For example, the person D can execute the smartphone game A in the smartphone 4d but cannot execute the game A since the person D does not have a game machine 3, or since the person D does not have the game machine application A even though the person D has a game machine 3.

In the server system 2, the totalized data of the game data D1, the totalized data of the game data D2, and the totalized data of the game data D3 are stored as the totalized data. The totalized data of the game data D1 is data obtained by totalizing the game data D1 of the respective user data, the totalized data of the game data D2 is data obtained by totalizing the game data D2 of the respective user data, and the totalized data of the game data D3 is data obtained by totalizing the game data D3 of the respective user data.

Figure 8:
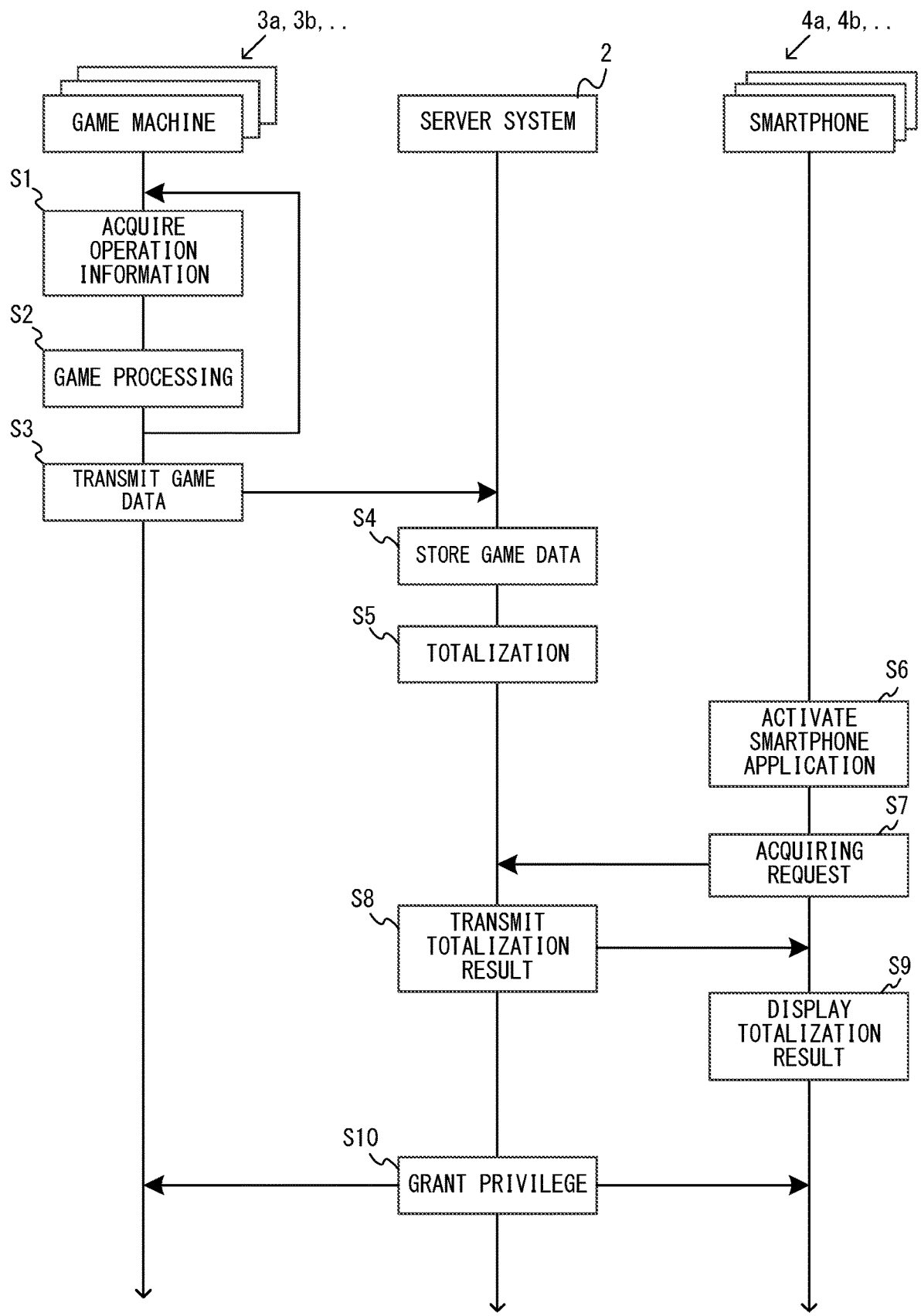
FIG. 8 is an example non-limiting diagram showing an example of flow of a process in the case of displaying a result obtained by totalizing information based on game processing performed in a plurality of game machines 3, on the smartphone 4.

Next, a specific example of information processing using the totalized data will be described. FIG. 8 is a diagram showing an example of flow of a process in the case of displaying a result obtained by totalizing information based on game processing performed in the plurality of game machines 3, on the smartphone 4.

As shown in FIG. 8, the game A is performed by the game machine application A being executed in each of the game machines 3a, 3b, etc. Each game machine 3 acquires operation information indicating an operation performed on the input section (the touch panel 31, the button 32, the direction indication key 33, the direction input stick 34, etc.) by the user (S1). The game machine 3 performs game processing on the basis of the acquired operation information (S2). For example, when the above fishing event is held in the game in the game machine 3, the game machine 3 controls the player character on the basis of the operation information to do fishing. In addition, for example, the game machine 3 operates the player character on the basis of the operation information to make a predetermined motion for gaining money (e.g., have a hunt) or to make a predetermined motion for spending money (e.g., purchase an item). The game machine 3 updates the game data in accordance with a result of the game processing. For example, when the player character gains money, the game machine 3 adds the amount of the gained money to the "game data D1". When the player character purchases an item, the game machine 3 subtracts the purchase amount of money for the item from the "game data D1". Moreover, for example, when the player character catches only one fish in the fishing event, the game machine 3 adds "1" to the "game data D2".

Next, the game machine 3 transmits the game data to the server system 2 at a predetermined time (S3), and the server system 2 receives and stores the game data (S4). Then, the server system 2 totalizes the stored game data (S5).

Meanwhile, in each smartphone 4, the smartphone application A is activated (S6). When the smartphone application A is activated and a predetermined operation for referring a totalization result is performed by the user of the smartphone 4, the smartphone 4 transmits a request for acquiring the totalization result, to the server system 2 (S7). The server system 2 transmits data indicating the totalization result in S5 to the smartphone 4 in response to the acquisition request (S8). The smartphone 4 displays the totalization result on the display section 45 by using the data that indicates the totalization result and is transmitted from the server system 2 (S9).

When the totalization result satisfies a predetermined condition, the server system 2 grants a privilege to the game machines 3 and/or the smartphones 4. For example, when the total amount of saved money indicated by a totalization result of the game data D1 exceeds a predetermined value, the server system 2 grants privileges to all the game machines 3 and the smartphones 4 registered in the server system 2. In addition, for example, when the total number of fish indicated by a totalization result of the game data D2 exceeds a predetermined value, the server system 2 grants privileges to all the game machines 3 and the smartphones 4. The privilege granted to each game machine 3 may be, for example, an item, a character, an image, and a sound that are useable in the game machines 3, money used in the game A or another game (currency in the game), a stage (or scene) in the game A or another game, or the like. In addition, the privilege granted to each smartphone 4 may be, for example, an item, a character, an image, and a sound that are useable in the smartphones 4, money used in the smartphone game A or another game, a stage (or scene) in the smartphone game A or another game, or the like. Grant of the privilege may be performed by transmission of real data regarding the privilege (e.g., image data of an image when the image is transmitted as the privilege) from the server system 2 to the game machines 3 and/or the smartphones 4, or by transmission of data for validating the real data, regarding the privilege, already stored in the game machines 3 and/or the smartphones 4.

Regardless of whether the user of the smartphone 4 that has transmitted an acquisition request is associated with any game machine 3, the server system 2 transmits the totalization result in accordance with the acquisition request from the user of each smartphone 4 registered in the server system 2. That is, the totalization result stored in the server system 2 can be referred to from all the smartphones 4 in which the smartphone application A is installed and the user IDs of which are registered in the server system 2. Therefore, the user who does not have the game machine 3 (or has the game machine 3 but does not have the game machine application A) can also see the totalization result from the smartphone 4, and thus can know the state of the game A performed in the game machines 3.

Although not shown, the totalization result can be referred to by accessing the server system 2 also from the game machine 3.

Figure 9:
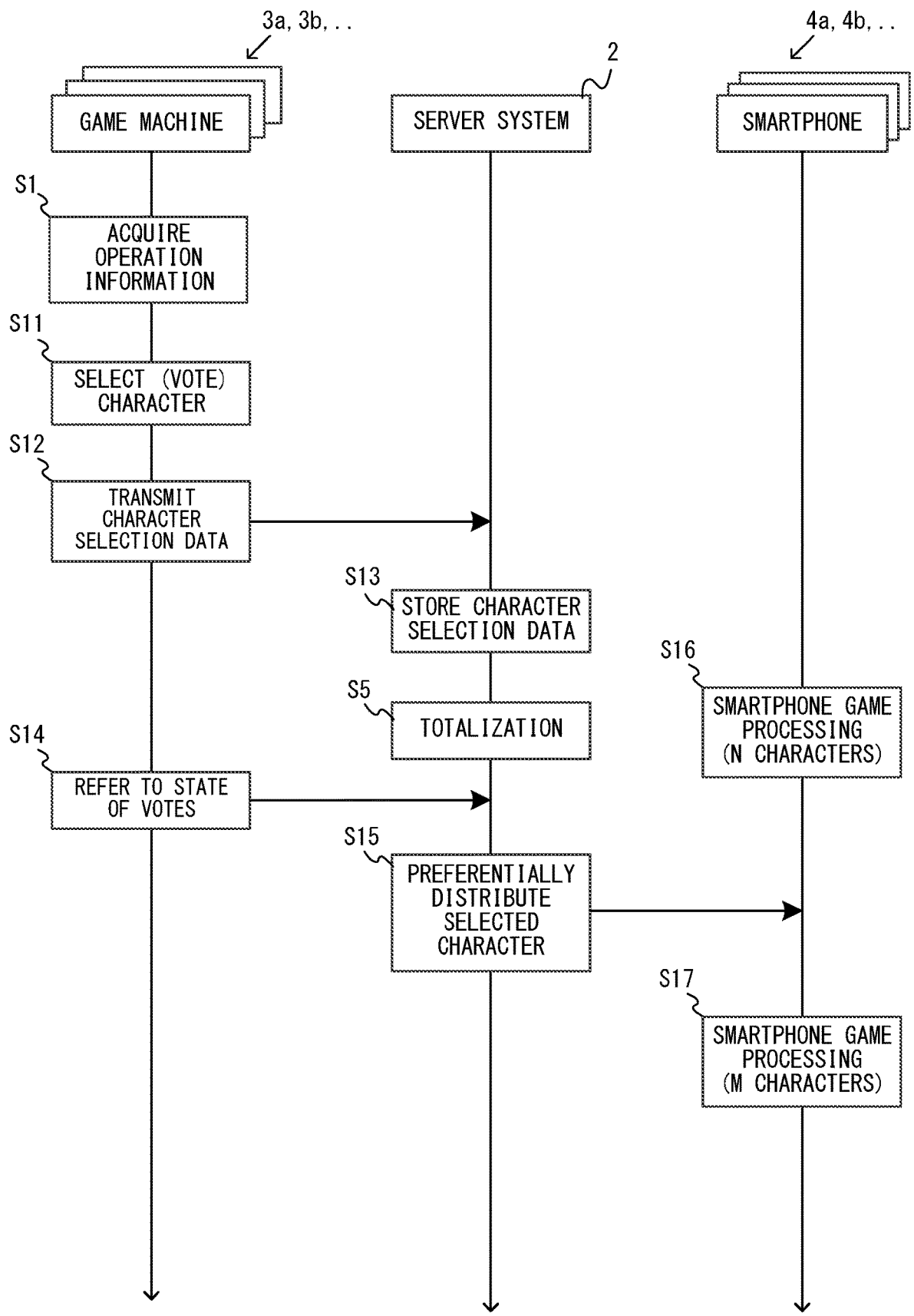
FIG. 9 is an example non-limiting diagram showing an example of flow of a process in the case of distributing a character to the smartphone 4 in accordance with a result obtained by totalizing information based on game processing performed in the plurality of game machines 3.

FIG. 9 is a diagram showing an example of flow of a process in the case of distributing a character to the smartphone 4 in accordance with a result obtained by totalizing information based on game processing in the plurality of game machines 3. FIG. 9 shows another process in the game A that is the same as the game shown in FIG. 8. In FIG. 9, processes that are the same as the processes shown in FIG. 8 are designated by the same reference characters, and the detailed description thereof is omitted.

Here, as described above, the smartphone game A to be performed in each smartphone 4 is a simplified version of the game A to be performed in each game machine 3. The number of characters that are usable in the smartphone game A is initially limited, and is smaller than the number of characters that are usable in the game A in the game machine 3. For example, in the smartphone game A, only 10 characters are initially usable, and the server system 2 distributes a new character to the smartphone 4 every predetermined period. When a character is distributed, the distributed character becomes usable in the smartphone game A. In the example shown in FIG. 9, each user votes for a character in the game A in the game machine 3, and the type of a character to be distributed is determined on the basis of the voting result.

As shown in FIG. 9, operation information is acquired in each game machine 3 (S1). The game machine 3 performs a process of selecting a character as game processing on the basis of the acquired operation information (S11). For example, ballot boxes corresponding to a plurality of characters, respectively, are provided in the virtual space of the game A performed in each game machine 3, and the user selects any character from among the plurality of characters by operating the player character to cast a vote into the corresponding ballot box.

Next, the game machine 3 transmits character selection data indicating a result of the character selection in S11, as the game data D3 to the server system 2 at a predetermined time (S12). The server system 2 stores the character selection data transmitted from the game machine 3, as user data (S13). Then, the server system 2 totalizes the stored character selection data (S5). Specifically, the server system 2 sums up the votes for each character to count the number of votes cast for each character.

The state of the totalization in S5 in the server system 2 can be referred to from the game machine 3 (S14). Specifically, the game machine 3 accesses the server system 2 and acquires the present state of votes for each character. For example, in the game machine 3, the present number of votes cast for each character may be displayed, or the number of votes cast for each character may be displayed stepwise. Accordingly, in the game machine 3, the user can know which character is popular. The present state of votes for each character may be allowed to be referred to also from the smartphone 4.

In the server system 2, setting of distributing a plurality of characters to each smartphone 4 is performed on the basis of the totalization result in S5 (S15). For example, setting of distributing a plurality of characters is performed in preference of characters for each of which the number of votes cast is larger.

Before the character distribution is performed in S15, for example, N characters are usable in the smartphone game A performed in the smartphone 4 (S16). After the character distribution is performed in S15, for example, M (>N) characters become usable in the smartphone game A (S17).

As described above, characters selected by the users in the respective game machines 3 are preferentially distributed to each smartphone 4. Accordingly, the result of the game performed in each game machine 3 is reflected in the smartphone game A performed in the smartphone 4.

Figure 10:
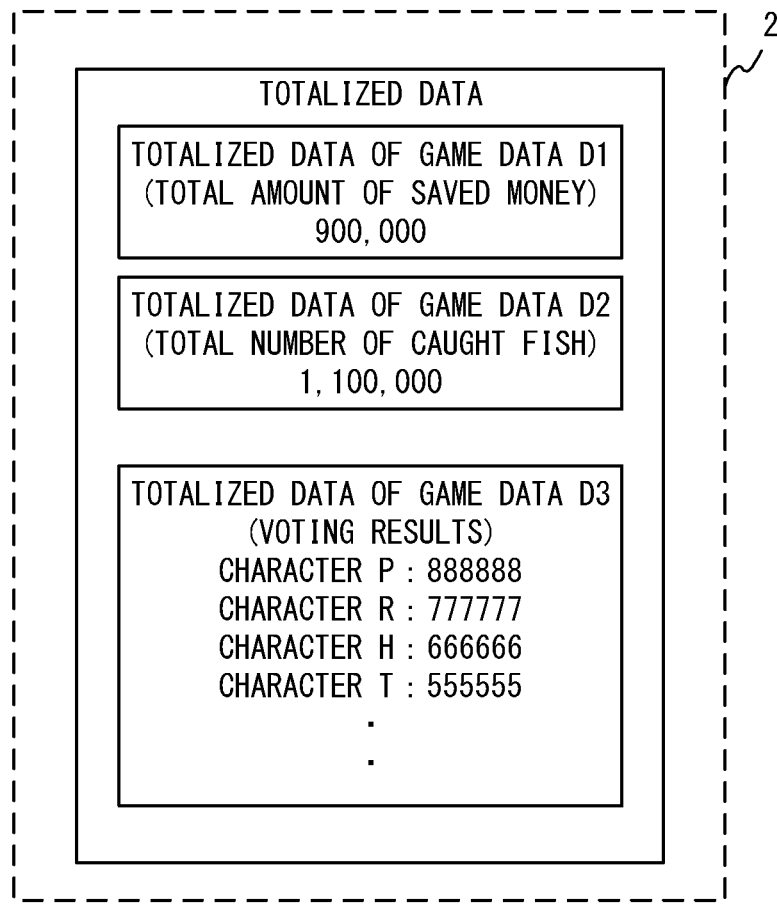
FIG. 10 is an example non-limiting diagram showing an example of totalized data stored in the server system 2 as a result of totalization in S5 in FIG. 8 or 9.

FIG. 10 is a diagram showing an example of totalized data stored in the server system 2 as a result of the totalization in S5 in FIG. 8 or 9.

As shown in FIG. 10, the totalized data of the game data D1, the totalized data of the game data D2, and the totalized data of the game data D3 are stored as totalized data in the server system 2. For example, the totalized data of the game data D1 indicates the total amount of saved money indicated by the game data D1 acquired from the plurality of game machines 3, and a numeric value of "900 thousands" is stored as the total value. In addition, the totalized data of the game data D2 indicates the total number of fish indicated by the game data D2 acquired from the plurality of game machines 3, and a numeric value of "1100 thousands" is stored as the total value. Moreover, the totalized data of the game data D3 indicates the number of votes cast for each character indicated by the game data D3 acquired from the plurality of game machines 3, and the number of votes cast for each character is indicated.

Figure 11:
FIG. 11 is an example non-limiting diagram showing an example of a screen displayed on the smartphone 4 when the smartphone 4 acquires the totalized data shown in FIG. 10.

FIG. 11 is a diagram showing an example of a screen displayed on the smartphone 4 when the smartphone 4 acquires the totalized data shown in FIG. 10. When the smartphone 4 acquires the totalized data shown in FIG. 10, a number of "1100 thousands" that is a number as the result of the fishing event, and a number of "900 thousands" that is the total amount of saved money, are displayed on the screen of the display section 45 of the smartphone 4 as shown in FIG. 11. For example, when a target for the fishing event is set to one million fish, the total value of fish exceeds this target value, and thus the user of the smartphone 4 (also the user of the game machine 3) becomes able to acquire a new character as a privilege. Meanwhile, when a target for a total amount of saved money is one million, the actual total amount of saved money does not reach the target, and thus the user cannot acquire a new item as a privilege at this time point. The totalization results shown in FIG. 11 can be also displayed on the game machine 3 by the game machine 3 accessing the server system 2.

Figures 12, 13:
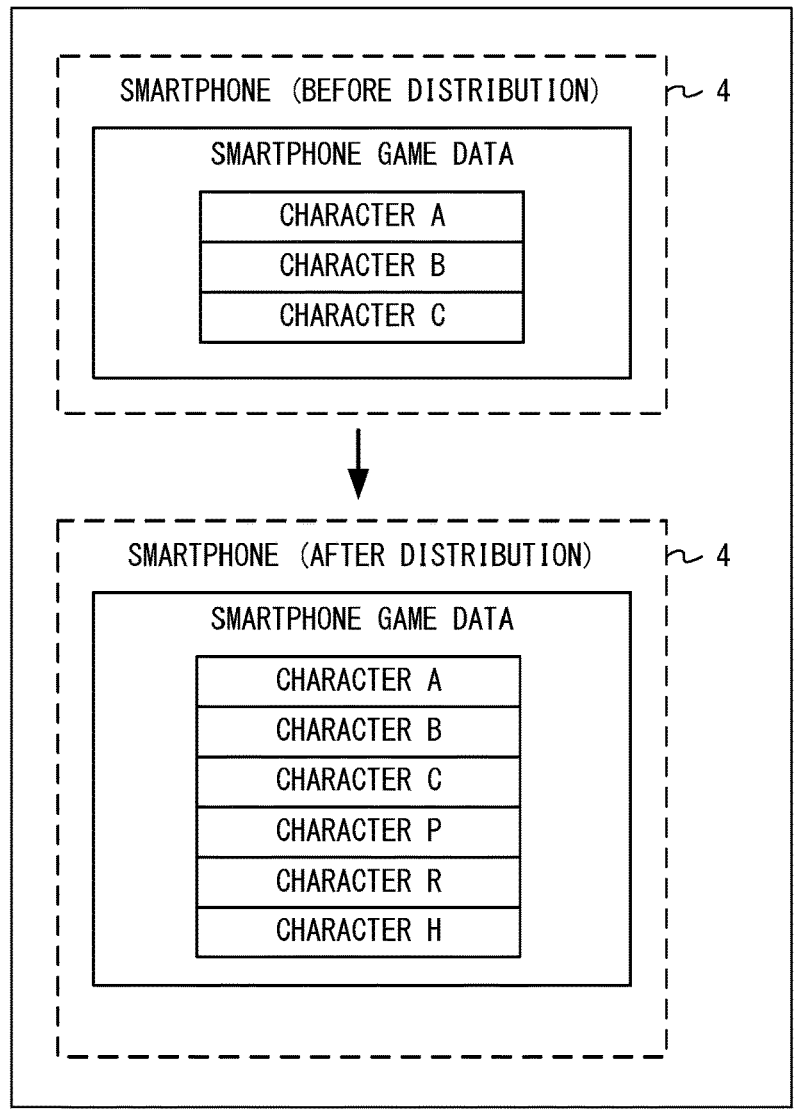
FIG. 12 is an example non-limiting diagram showing an example of data stored in the smartphone 4 before and after the character distribution shown in FIG. 9.
FIG. 13 is an example non-limiting diagram showing an example of the screen of the smartphone 4 when a certain user access the server system 2 by using the smartphone 4 and refers to game data of the game machine 3 stored in the server system 2.

FIG. 12 is a diagram showing an example of data stored in the smartphone 4 before and after the character distribution shown in FIG. 9. As shown in FIG. 12, before the character distribution from the server system 2, data of a character A, a character B, and a character C are stored as the smartphone game data in the smartphone 4. Meanwhile, after the character distribution from the server system 2, data of new characters P, R, and H are stored in the smartphone 4 in addition to the characters A to C. The new characters P, R, and H may become usable in the smartphone 4 by distribution of real data regarding the new characters P, R, and H from the server system 2. Alternatively, the real data regarding the characters P, R, and H may be stored in the smartphone 4 before the character distribution, and the new characters P, R, and H may become usable in the smartphone 4 by transmission of data for validating (making usable) the characters P, R, and H, from the server system 2 to the smartphone 4.

Here, when the user ID of the game machine 3 is associated with the user ID of the smartphone 4 in the server system 2 as described above, the user identified by the user ID can access the server system 2 from their own smartphone 4 and refer to the user data of their own game machine 3 stored in the server system 2.

FIG. 13 is a diagram showing an example of the screen of the smartphone 4 when a certain user accesses the server system 2 by using the smartphone 4 and refers to the game data of the game machine 3 stored in the server system 2. As shown in FIG. 13, common information and user information are displayed on the screen of the smartphone 4 as the game data of the game machine 3 stored in the server system 2. The common information is information indicated by the "village data", and is, for example, information indicating the value of the present village. The user information is information specific to the user, and is, for example, information indicating the present amount of saved money of the user. In this manner, the user can confirm the state of the game A in their own game machine 3 by using their own smartphone 4. For example, even when the user does not carry the game machine 3 at present, if the user carries the smartphone 4, the user can confirm the state of the game A in the game machine 3 by using the smartphone 4. In addition, the user can confirm the common information as well as their own user information in the game machine 3 by using the smartphone 4. Therefore, by confirming the common information using the smartphone 4, the user can convey, to another user who uses this game machine 3, the present information regarding the common information (information common to the other user), so that communication between the users can be activated.

[4. Details of Process in Each Apparatus]

Hereinafter, the details of a process performed in each apparatus of the information processing system 1 according to the present embodiment will be described.

(Process 1 of Game Machine 3)

Figure 14:
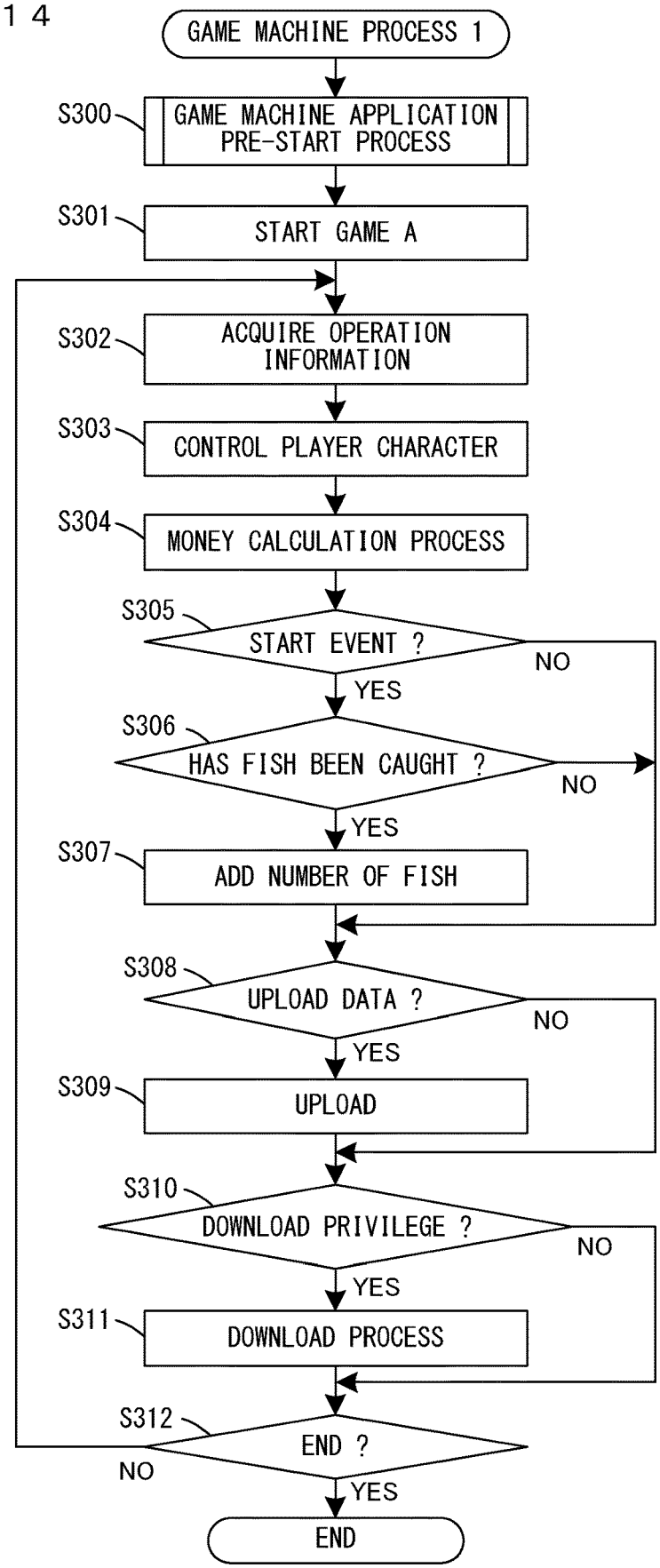
FIG. 14 is an example non-limiting flowchart showing an example of a process of the game machine 3 when the process shown in FIG. 8 is performed.

FIG. 14 is a flowchart showing an example of a process of the game machine 3 when the process shown in FIG. 8 is performed.

As shown in FIG. 14, the game machine 3 (the processing section 35 thereof) initially performs a game machine application pre-start process (step S300). The game machine application pre-start process is a process for performing initial setting before the game A by the above-described game machine application A is started. Hereinafter, the details of the game machine application pre-start process will be described with reference to FIG. 15.

Figure 15:
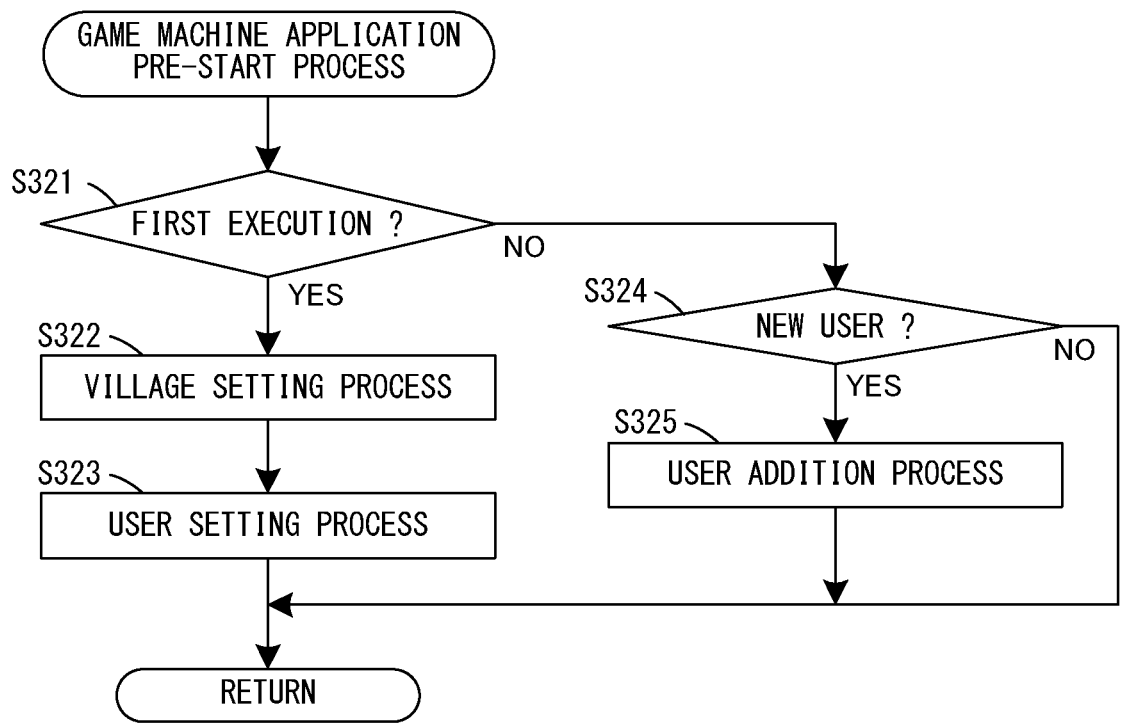
FIG. 15 is an example non-limiting flowchart showing the details of a game machine application pre-start process in step S300 in FIG. 14.

FIG. 15 is a flowchart showing the details of the game machine application pre-start process in step S300 in FIG. 14. As shown in FIG. 15, the game machine 3 determines whether execution of the game machine application A is for the first time (step S321). When the game machine application A is activated in the game machine 3 for the first time, it is determined as YES in step S321. Specifically, the game machine 3 determines whether execution of the game machine application A is for the first time, by determining whether game data regarding the game A is stored in the storage section 36 of the game machine 3. When the game machine 3 determines that execution of the game machine application A is for the first time (step S321: YES), the game machine 3 performs a village setting process (step S322). In step S322, initial setting regarding a village is performed on the basis of an input from the user. The initial setting regarding the village is to set an initial value for the common information. For example, the types of characters initially present in the village are set, and a name of the village is set. Subsequent to step S322, the game machine 3 performs a user setting process (step S323). In step S323, for example, information regarding a player character of the user (a name, a birthday, a face, a body type, and the like of the player character) is set.

On the other hand, when the game machine 3 determines that execution of the game machine application A is not for the first time (step S321: NO), the game machine 3 determines whether the user is a new user (step S324). Specifically, the game machine 3 determines whether the user who is about to play the game A is a new user for the game A, by determining whether user data corresponding to the present user is stored in the storage section 36. When the game machine 3 determines that the user is a new user (step S324: YES), the game machine 3 performs a user addition process (step S325). In step S325, similarly to step S323, the game machine 3 performs setting of information regarding a player character of the new user. Through execution of step S325, a new player character (resident) is set in a village that is already present in the game machine 3.

When the game machine 3 executes step S323, when the game machine 3 executes step S325, or when the game machine 3 determines NO in step S324, the game machine 3 ends the process shown in FIG. 15 and returns the processing to FIG. 14.

Referring back to FIG. 14, after the process in step S300, the game machine 3 starts the game A (step S301).

Subsequently, the game machine 3 acquires operation information corresponding to an operation performed on the input section (31 to 34) (step S302). Next, the game machine 3 controls the player character on the basis of the operation information acquired in step S302 (step S303). For example, the game machine 3 moves the player character in a virtual space or causes the player character to make a predetermined motion. Subsequently, the game machine 3 performs a money calculation process (step S304). For example, when the player character gains money used in the game A as a result of the control of the player character in step S303, the game machine 3 adds the amount of the gained money to the amount of saved money stored in the storage section 36. The process in step S304 is not performed only in a specific period but is constantly performed during execution of the game A, unlike a process in step S307 described later.

Next, the game machine 3 determines whether to start an event (step S305). For example, when the time and the date in the game machine 3 indicated by the RTC is within a specific period in which a predetermined event is to be held, the game machine 3 determines to start the event in step S305. When the game machine 3 determines YES in step S305, the game machine 3 determines YES in step S305 in processing thereafter until the event ends. When the game machine 3 determines to start the event (step S305: YES), the game machine 3 determines whether the player character has caught any fish (step S306). Specifically, the game machine 3 determines whether the player character has caught any fish, in accordance with the process in step S303. When the game machine 3 determines that the player character has caught any fish (step S306: YES), the game machine 3 adds the number of the fish (step S307).

When the game machine 3 performs the process in step S307, when the game machine 3 determines NO in step S305, or when the game machine 3 determines NO in step S306, the game machine 3 determines whether to upload the user data to the server system 2 (step S308). For example, when the game A shifts from a certain scene to another scene, or when the game machine 3 connects to a wireless LAN, the game machine 3 determines to upload the user data to the server system 2. The time at which the game machine 3 uploads the user data to the server system 2 may be any time. For example, the user data stored in the storage section 36 may be uploaded to the server system 2 at the time at which the game A is started or ended. In addition, the game machine 3 may upload the user data at predetermined time intervals or at random times.

When the game machine 3 determines to upload the user data (step S308: YES), the game machine 3 uploads the user data stored in the storage section 36 (step S309). Specifically, the game machine 3 accesses the server system 2 and transmits the user ID and the user data to the server system 2. The user data transmitted here includes the game data D1 indicating the amount of saved money added in step S304, and the game data D2 indicating the number of fish added in step S307.

When the game machine 3 performs the process in step S309, or when the game machine 3 determines NO in step S308, the game machine 3 determines whether to download a privilege from the server system 2 (step S310). For example, the game machine 3 may determine to download the privilege, on the basis of an instruction from the user. When the game machine 3 determines to download the privilege (step S310: YES), the game machine 3 downloads data indicating the privilege granted from the server system 2 (step S311).

When the game machine 3 performs the process in step S311, or when the game machine 3 determines NO in step S310, the game machine 3 determines whether to end the game A (step S312). When the game A is not ended (step S312: NO), the game machine 3 performs the process in step S302 again. By the processes in steps S302 to S312 being repeatedly performed, the game A proceeds. This is the end of the description of the process shown in FIG. 14.

(Process 2 of Game Machine 3)

Figure 16:
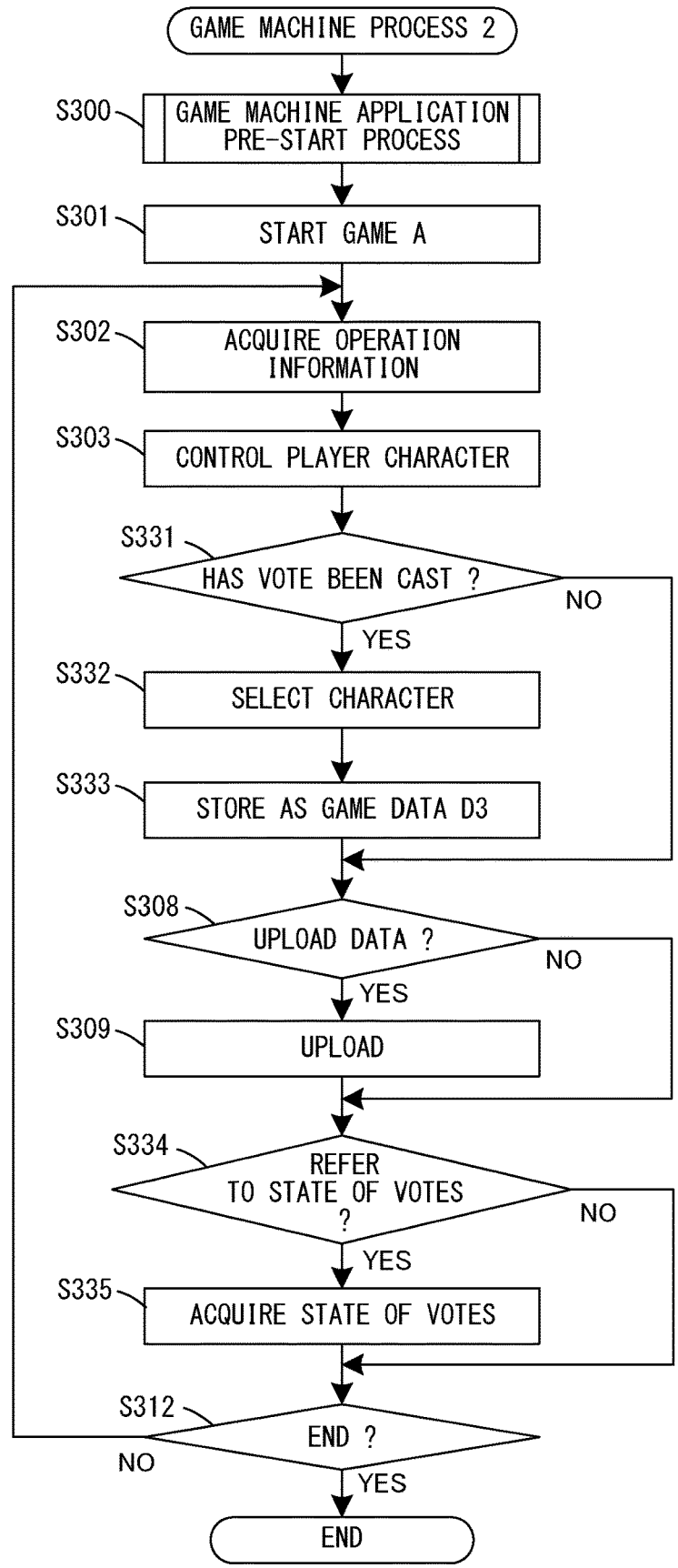
FIG. 16 is an example non-limiting flowchart showing an example of a process of the game machine 3 when the process shown in FIG. 9 is performed.

FIG. 16 is a flowchart showing an example of a process of the game machine 3 when the process shown in FIG. 9 is performed. In FIG. 16, the same processes as in FIG. 14 are designated by the same reference characters, and the detailed description thereof is omitted.

The game machine 3 controls the player character on the basis of operation information acquired from the input section (step S303), and determines whether the player character has reached a ballot box provided in the virtual space and cast a vote (step S331). In the virtual space, a ballot box for selecting a character is provided for each character. The user moves the player character in the virtual space to a ballot box corresponding to the character for which the user votes (in other words, selects), and casts a vote for the character (selects the character). Ballot boxes corresponding to characters other than characters that have already been distributed to the smartphone 4, are provided in the virtual space. Thus, for example, when a plurality of characters are separately distributed to each smartphone 4 a plurality of times, the ballot box corresponding to the character distributed to each smartphone 4 by distribution for the first time does not appear in the virtual space thereafter. Therefore, the user who is playing the game A in the game machine 3 can select (vote for) any of the characters that have not been distributed to each smartphone 4, but cannot select the character that has already been distributed to each smartphone 4.

When the player character has cast a vote (step S331: YES), the game machine 3 selects the voted character (step S332) and stores data indicating that the character is selected, as the game data D3 in the storage section 36 (step S333).

Subsequently, the game machine 3 determines whether to upload the game data D3 stored in step S333 to the server system 2 (step S308). When the game machine 3 determines to upload the game data D3, the game machine 3 uploads the user data including the game data D3, to the server system 2 (step S309).

Subsequently, the game machine 3 determines whether to refer to the state of votes for the characters totalized in the server system 2 (step S334). When the game machine 3 determines to refer to the state of votes (step S334: YES), the game machine 3 acquires data indicating the present state of votes for each character from the server system 2, and displays the state of votes on the display section 39 of the game machine 3 on the basis of the acquired data (step S335). This is the end of the description of the process shown in FIG. 16.

(Process 1 of Server System 2)

Figure 17:
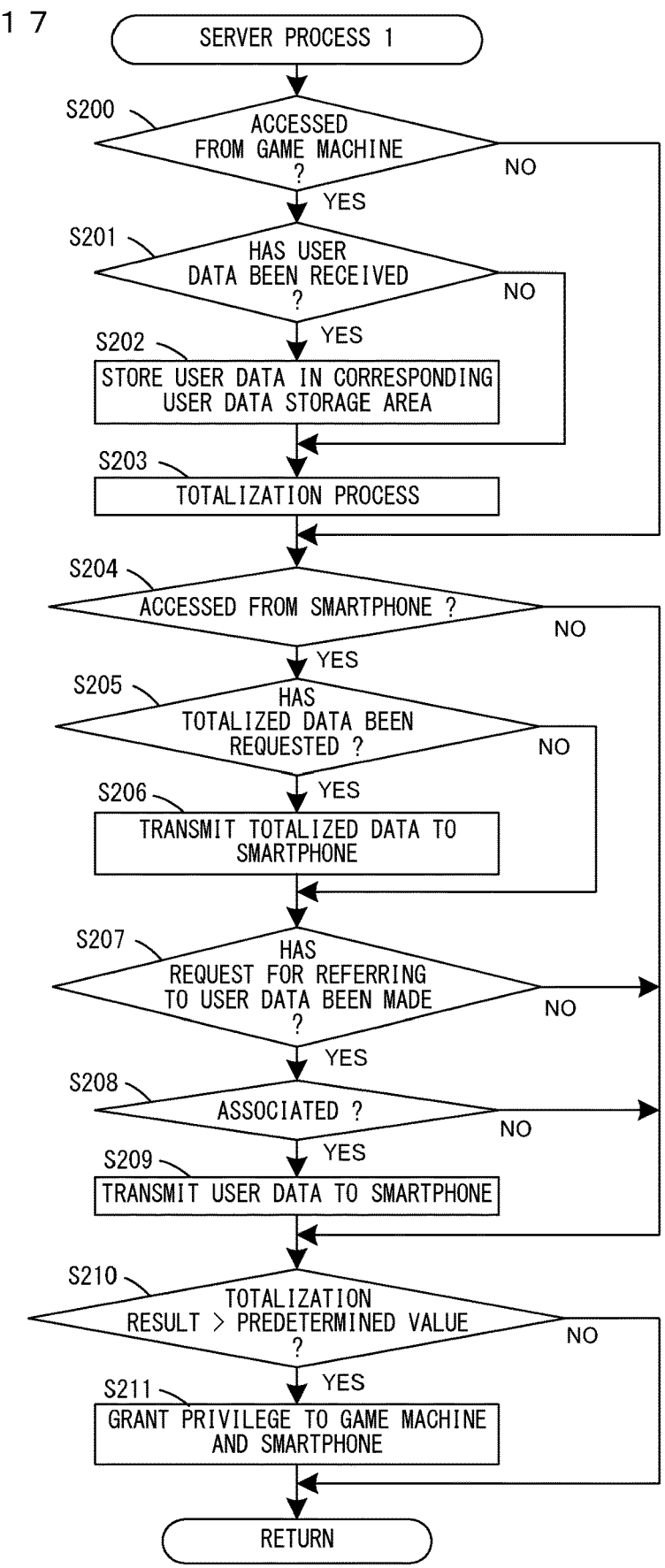
FIG. 17 is an example non-limiting flowchart showing an example of a process of the server system 2 when the process shown in FIG. 8 is performed.

FIG. 17 is a flowchart showing an example of a process of the server system 2 when the process shown in FIG. 8 is performed. The server system 2 repeatedly performs the process shown in FIG. 17 at predetermined time intervals.

As shown in FIG. 17, the server system 2 determines whether the server system 2 is being accessed from any game machine 3 (step S200). Specifically, the server system 2 determines whether the server system 2 is being accessed from any game machine 3, and, when the server system 2 is being accessed from any game machine 3, the server system 2 acquires the user ID from the game machine 3, and determines whether to permit the access from the game machine 3, by determining whether the acquired user ID agrees with any of the user IDs of the game machines 3 registered in the server system 2 in advance. The server system 2 may perform a process of authenticating the user of the game machine 3 by using the user ID and a password.

When the server system 2 determines to permit the access from the game machine 3 (step S200: YES), the server system 2 determines whether the user data has been received from the game machine 3 (step S201).

When the user data has been received from the game machine 3 (step S201: YES), the server system 2 stores the received user data in the user data storage area associated with the user ID of the game machine 3 (step S202).

When the server system 2 performs the process in step S202, or when the server system 2 determines NO in step S201, the server system 2 performs a totalization process (step S203). Specifically, the server system 2 acquires the game data included in the user data stored in each user data storage area, and calculates the sum of the values indicated by the respective game data. More specifically, the server system 2 classifies a plurality of types of game data (the game data D1 to D3) by type, and calculates the total value for each type. For example, the server system 2 calculates a total value of the game data D1, a total value of the game data D2, and a total value of the game data D3. The server system 2 may collectively totalize two or more of the plurality of types of game data. For example, the server system 2 may calculate a total value of the game data D1 to D3.

When the server system 2 performs the process in step S203, or when the server system 2 determines NO in step S200, the server system 2 determines the server system 2 is being accessed from any smartphone 4 (step S204). Specifically, the server system 2 determines whether the server system 2 is being accessed from any smartphone 4, and, when the server system 2 is being accessed from any smartphone 4, the server system 2 acquires the user ID from the smartphone 4, and determines to permit the access from the smartphone 4, by determining whether the acquired user ID agrees with any of the user IDs of the smartphones 4 registered in the server system 2 in advance.

When the server system 2 determines to permit the access from the smartphone 4 (step S204: YES), the server system 2 determines whether a request for acquiring totalized data has been made (step S205). When a request for acquiring totalized data has been made by the smartphone 4 (step S205: YES), the server system 2 transmits the totalized data to the smartphone 4 that has requested the totalized data (step S206).

When the server system 2 performs the process in step S206, or when the server system 2 determines NO in step S205, the server system 2 determines whether a request for referring to the user data has been made by the smartphone 4 (step S207).

When a request for referring to the user data has been made by the smartphone 4 (step S207: YES), the server system 2 determines whether the user ID of the smartphone 4 that has transmitted the referring request is associated with any of the user IDs of the multiple game machines 3 registered in the server system 2 (step S208). When the user ID of the smartphone 4 is associated with any of the user IDs of the game machines 3 (step S208: YES), the server system 2 transmits the user data corresponding to the user ID of the game machine 3, to the smartphone 4 (step S209).

When the server system 2 performs the process in step S209, when the server system 2 determines NO in step S208, when the server system 2 determines NO in step S207, or when the server system 2 determines NO in step S204, the server system 2 determines whether the result of the totalization process in step S203 exceeds a predetermined value (step S210). For example, the server system 2 determines whether the total amount of saved money indicated by the totalized data of the game data D1 exceeds a predetermined value, and determines whether the total number of fish indicated by the totalized data of the game data D2 exceeds a predetermined value.

When the server system 2 determines that the totalization result exceeds the predetermined value (step S210: YES), the server system 2 grants a privilege to the game machine 3 and the smartphone 4 (step S211). Specifically, the server system 2 sets the granted privilege to be downloadable, and when a request for downloading the privilege is made by the game machine 3 and/or the smartphone 4 thereafter, the server system 2 transmits data indicating the privilege, to the game machine 3 and/or the smartphone 4 in response to the downloading request. The privilege to be granted may be, for example, a character, an item, money, an image, or a sound to be used in the game A, a stage of the game A, or the like. This is the end of the description of the process shown in FIG. 17.

(Process 2 of Server System 2)

Figure 18:
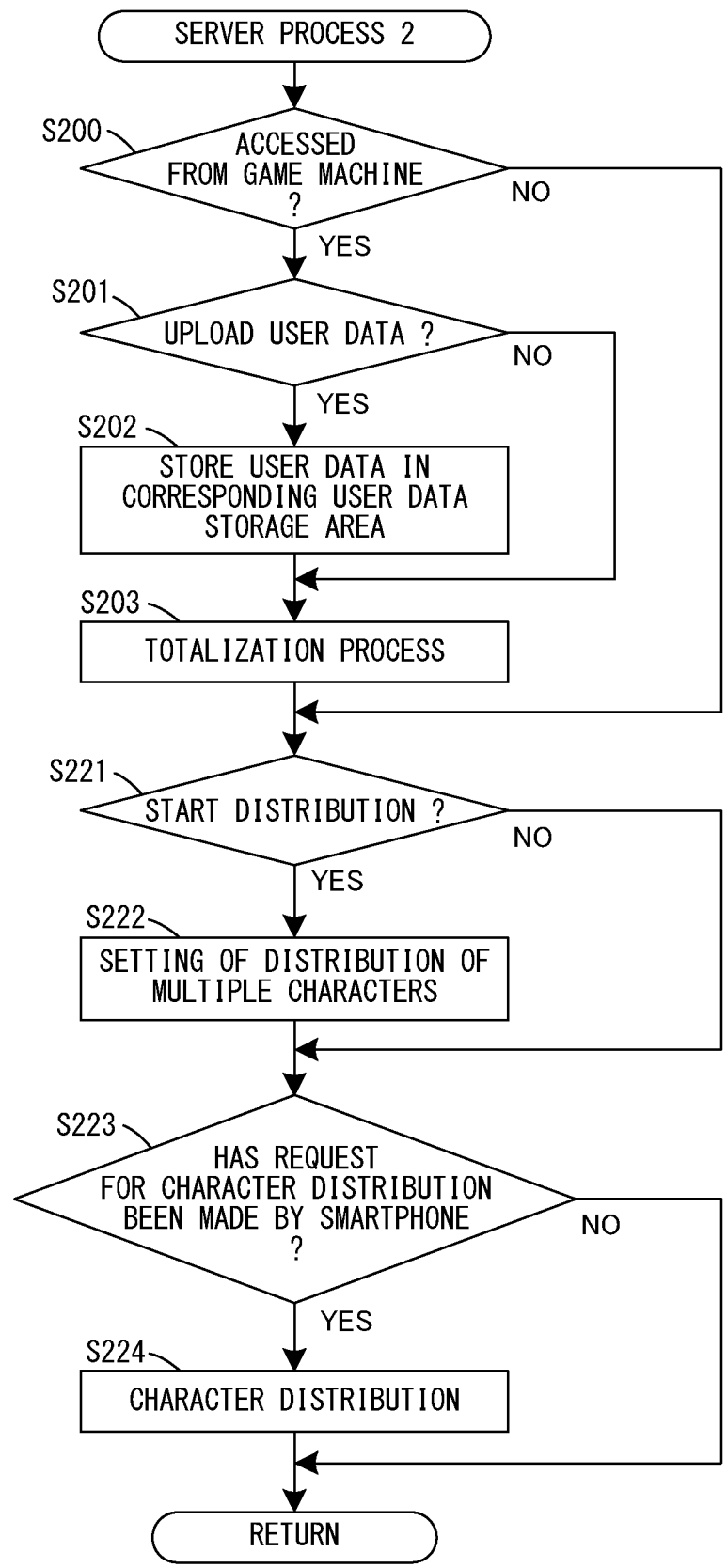
FIG. 18 is an example non-limiting flowchart showing an example of a process of the server system 2 when the process shown in FIG. 9 is performed.

FIG. 18 is a flowchart showing an example of a process of the server system 2 when the process shown in FIG. 9 is performed. In FIG. 18, the same processes as in FIG. 17 are designated by the same reference characters, and the detailed description thereof is omitted. The server system 2 repeatedly performs the process shown in FIG. 18 at predetermined time intervals.

As shown in FIG. 18, the server system 2 performs a totalization process of totalizing the user data stored in the respective user data storage areas (step S203). In the totalization process in step S203, the server system 2 totalizes the game data D3 of the respective user data and calculates the number of votes for each character.

When the server system 2 performs the process in step S203, or when the server system 2 determines NO in step S200, the server system 2 determines whether to start distribution of a new character (step S221). The time at which distribution of a character is started may be determined in advance, and distribution of a character may be automatically started at the predetermined time, or distribution of a character may be manually started by the administrator of the server system 2. Distribution of a new character may be performed, for example, weekly.

When the server system 2 determines to start distribution of a character (step S221: YES), the server system 2 performs setting of distribution of a plurality of new characters. That is, the server system 2 sets a plurality of new characters to be downloadable from each smartphone 4. Which of all characters is to be distributed in the distribution this time may be automatically determined by the server system 2 on the basis of the totalization result in step S203, or may be determined by the administrator of the server system 2 referring to the totalization result of the step S203. When distribution of a new character is started, the server system 2 may send, to each smartphone 4, a notification that the distribution of the new character has been started.

When the server system 2 performs the process in step S222, or when the server system 2 determines NO in step S221, the server system 2 determines whether a request for character distribution has been made by any smartphone 4 (step S223). When a request for character distribution has been made by any smartphone 4 (step S223: YES), the server system 2 distributes the characters for which the distribution setting is performed in step S222, to the smartphone 4 (step S224). The characters may be distributed by transmitting real data (image data, shape data, etc.) of the characters from the server system 2 to the smartphone 4. In addition, the real data of the characters may be stored in the smartphone 4 in advance, and the distribution of the characters may be performed by validating the characters in the smartphone 4 in accordance with data for validating the characters being received from the server system 2. This is the end of the description of the process shown in FIG. 18.

(Process of Smartphone 4)

Figure 19:
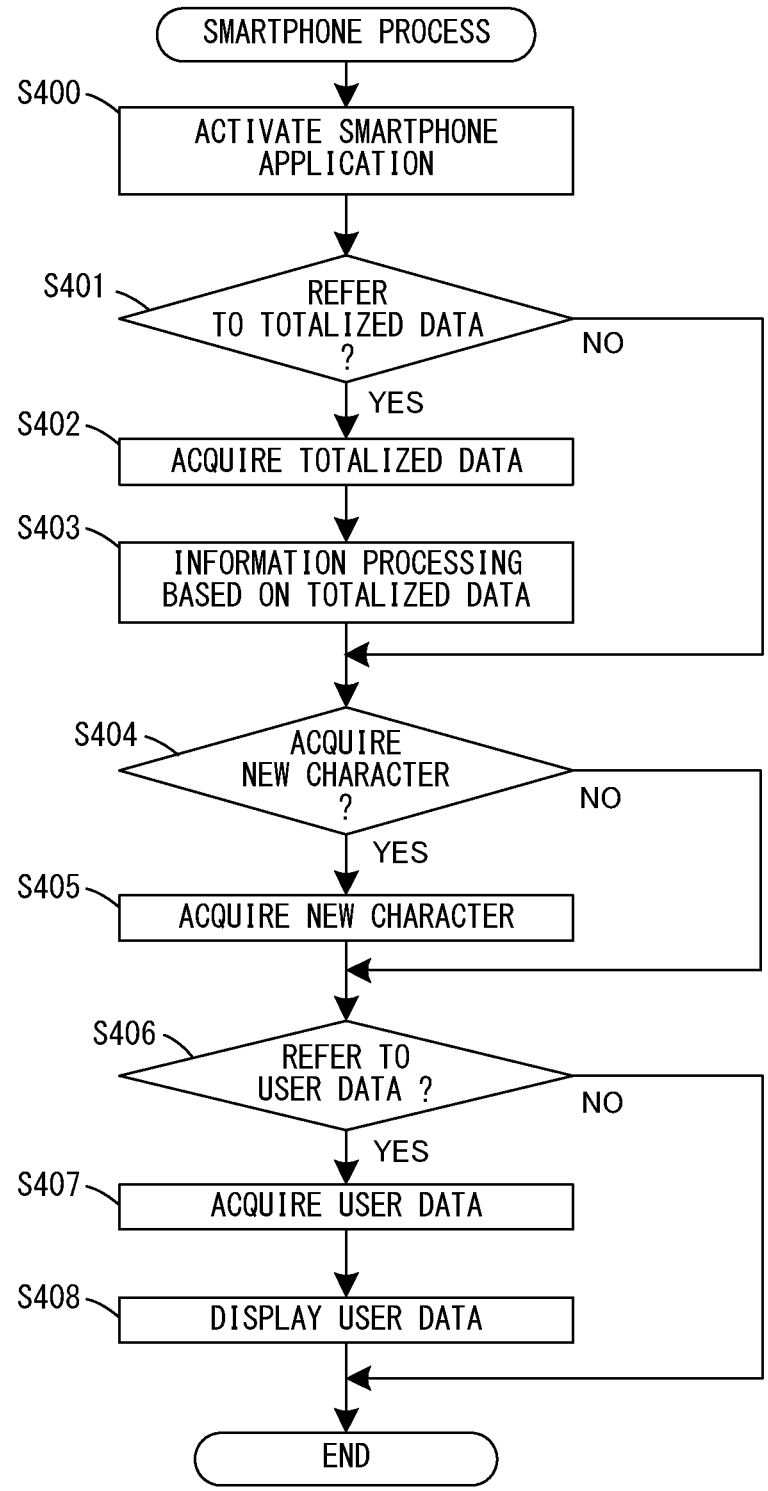
FIG. 19 is an example non-limiting flowchart showing an example of a process performed in the smartphone 4.

FIG. 19 is a flowchart showing an example of a process performed in the smartphone 4.

First, in the smartphone 4, the smartphone application A is activated (step S400). Subsequently, the smartphone 4 determines whether to refer to the totalized data (step S401). For example, when an operation for referring to the totalized data is performed by the user, the smartphone 4 determines to refer to the totalized data. When the smartphone 4 determines to refer to the totalized data (step S401: YES), the smartphone 4 accesses the server system 2 and acquires the totalized data therefrom (step S402). Specifically, the smartphone 4 transmits the user ID and a request for acquiring the totalized data, to the server system 2. The smartphone 4 acquires the totalized data by the above process in step S206 being performed in the server system 2 in response to the acquiring request.

After acquiring the totalized data, the smartphone 4 performs information processing based on the acquired totalized data (step S403). Specifically, the smartphone 4 displays a totalization result indicated by the acquired totalized data, on the display section 45.

When the smartphone 4 performs the process in step S403, or when the smartphone 4 determines NO in step S401, the smartphone 4 determines whether to acquire a new character from the server system 2 (step S404). When the smartphone 4 determines to acquire a new character (step S404: YES), the smartphone 4 accesses the server system 2 and acquires a new character from the server system 2 (step S405). Accordingly, the new character appears in the smartphone game A performed in the smartphone 4.

When the smartphone 4 performs the process in step S405, or when the smartphone 4 determines NO in step S404, the smartphone 4 determines whether to refer to the user data stored in the server system 2, by determining whether there is an instruction from the user (step S406). When the smartphone 4 determines to refer to the user data (step S406: YES), the smartphone 4 acquires the user data from the server system 2 by transmitting the user ID and a request for referring to the user data, to the server system 2 (step S407). Subsequently, the smartphone 4 displays the acquired user data on the display section 45 (step S408).

In addition to the process shown in FIG. 19, the smartphone 4 performs a process regarding the smartphone game A. Specifically, the smartphone 4 moves the player character in the smartphone game A within the virtual space, or causes the player character to make a predetermined motion, on the basis of an operation of the user. This is the end of the description of the process shown in FIG. 19.

As described above, in the information processing system 1 according to the present embodiment, information based on game processing performed in the plurality of game machines 3 is transmitted to the server system 2. The server system 2 totalizes the information, based on the game processing, received from each game machine 3, and transmits the totalization result to each smartphone 4. The smartphone 4 performs predetermined information processing based on the received totalization result. For example, the smartphone 4 displays the totalization result on the display section 45, as the predetermined information processing. The smartphone 4 may perform other information processing on the basis of the acquired totalization result. For example, the smartphone 4 may perform the smartphone game A, which is performed in each smartphone 4, by using the acquired totalization result. In addition, the smartphone 4 may perform game processing of a game different from the smartphone game A, by using the acquired totalization result.

Specifically, the game A is performed in each of the plurality of game machines 3, and a specific parameter is set in the game A by the player character making a predetermined motion (e.g., gaining or spending money, doing fishing, selecting (e.g., voting) a character, etc.) on the basis of an input of the user. For example, in the game machine 3, money gained by the player character or the number of fish caught by the player character is counted, and the counting result is set as the specific parameter, or the specific parameter is set in accordance with selection of a character. Each game machine 3 transmits the specific parameter to the server system 2. The server system 2 totalizes the specific parameter from each game machine 3, and transmits the totalization result to each smartphone 4. In the smartphone 4, the totalization result of the specific parameters in the game A in the plurality of game machines 3 can be seen. Accordingly, the user of the smartphone 4 can know the state of the game A performed in each game machine 3, so that the user of the smartphone 4 can be intrigued with the game A performed in each game machine 3.

In the above embodiment, the player character is caused to make a predetermined motion in accordance with an input of the user of the game machine 3, and the counting process (a process of adding or subtracting money, a process of adding the number of fish caught, etc.) is performed on the basis of the predetermined motion. However, the counting process based on the predetermined motion may be any process. For example, in a game in which a player character plays against a predetermined character, the number of wins of the player character may be counted, or in a racing game, a time of a player character may be counted. In addition, the counting process may not be necessarily performed on the basis of the predetermined motion of the player character controlled in accordance with the input of the user. For example, the number of times a non-player character makes a predetermined motion may be counted, or the number of non-player characters appearing in the game may be counted.

(Grant of Privilege from Smartphone to Game Machine)

Figure 20:
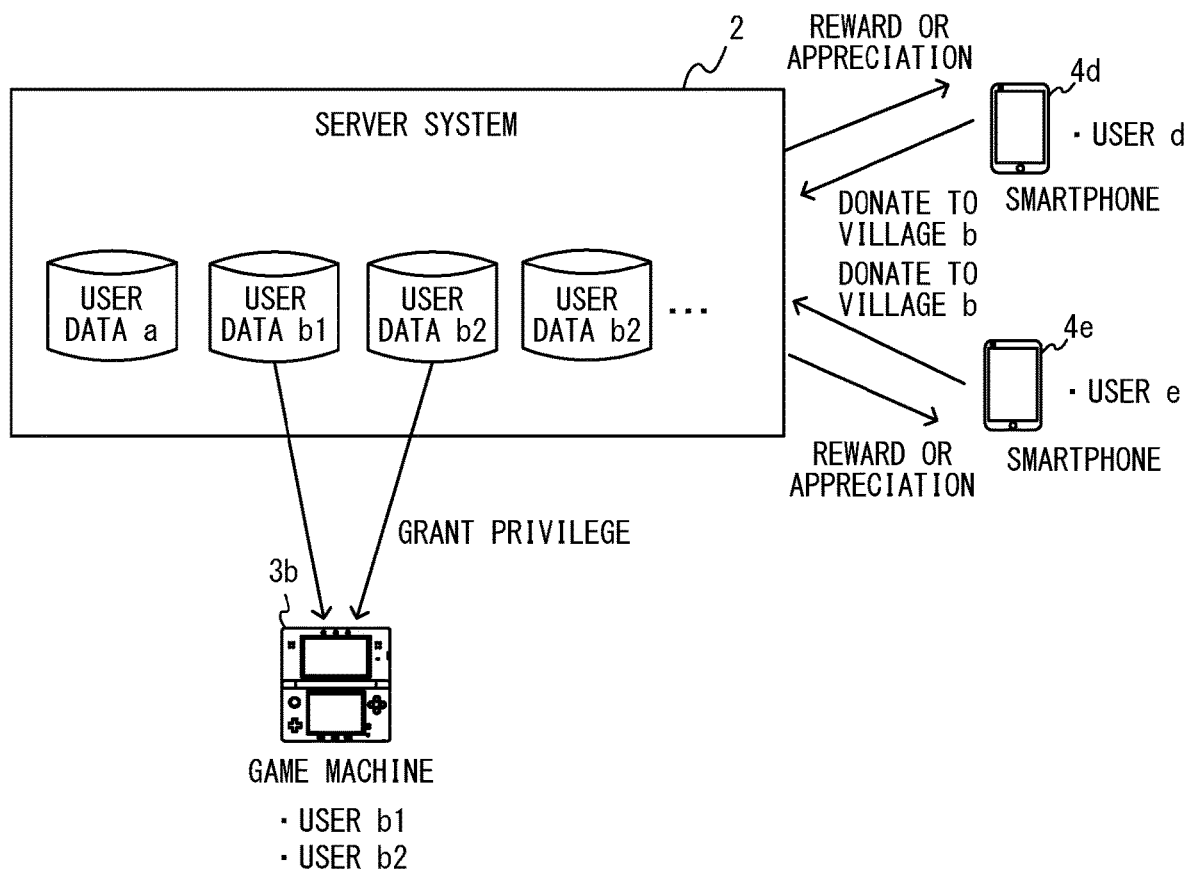
FIG. 20 shows another outline of the information processing system 1 and is an example non-limiting diagram showing an example of the case where a privilege is granted from the smartphone 4 to the game machine 3.

Next, another example using the above-described information processing system 1 will be described. FIG. 20 shows another outline of the information processing system 1 and is a diagram showing an example of the case where a privilege is granted from the smartphone 4 to the game machine 3.

As shown in FIG. 20, the user of each smartphone 4 executes the smartphone application A and accesses the server system 2. The user of each smartphone 4 donates a predetermined item to the "village" in the game machine 3. For example, the user d of the smartphone 4d inputs identification information corresponding to a village b formed in the game machine 3b, on a screen of the smartphone application A, and donates a predetermined item to the village b formed in the game machine 3b. In addition, a user e of a smartphone 4e also similarly donates a predetermined item to the village b. Here, the predetermined items are not items possessed by the users of the smartphones 4 in the smartphone game A, and are items that can be donated to any village. Even when the predetermined item is donated to a certain village, the predetermined item is not lost, and can be donated to another village. Thus, the user of the smartphone 4 that donates the predetermined item does not consume items possessed by the user in the smartphone game A. The predetermined item can be donated to the same village only once.

An item possessed by the user of the smartphone 4 in the smartphone game A may be donated to a specific village of the game machine 3. In this case, after the donation of the item, the donated item becomes unusable in the smartphone game A.

Every time the game machine 3b receives a donation of the predetermined item, a privilege is granted to the game machine 3b receiving the donation. For example, a special item is given to each user of the game machine 3b. For example, when a player character of the user b1 and a player character of the user b2 are present in the village b, a special item is given to the player character of the user b1, and a special item is also given to the player character of the user b2. The special item may be an item different from an item that is normally available in the game A of the game machine 3, and may be an item that cannot be obtained unless a donation of the predetermined item is received from the smartphone 4.

To the user of the smartphone 4 who has donated the predetermined item, a reward or appreciation for the donation is given. For example, the reward or appreciation may be an item, a character, money, or the like that can be used in the smartphone game A, or may be a message. For example, the user of the game machine 3 who has received a donation may send a message to the user of the smartphone 4 who has given the donation.

In addition, information about a donation from the smartphone 4 is stored as history in the server system 2, and the user of the game machine 3 can know from which user the donation has been received.

(Process in Smartphone 4 in FIG. 20)

Figure 21:
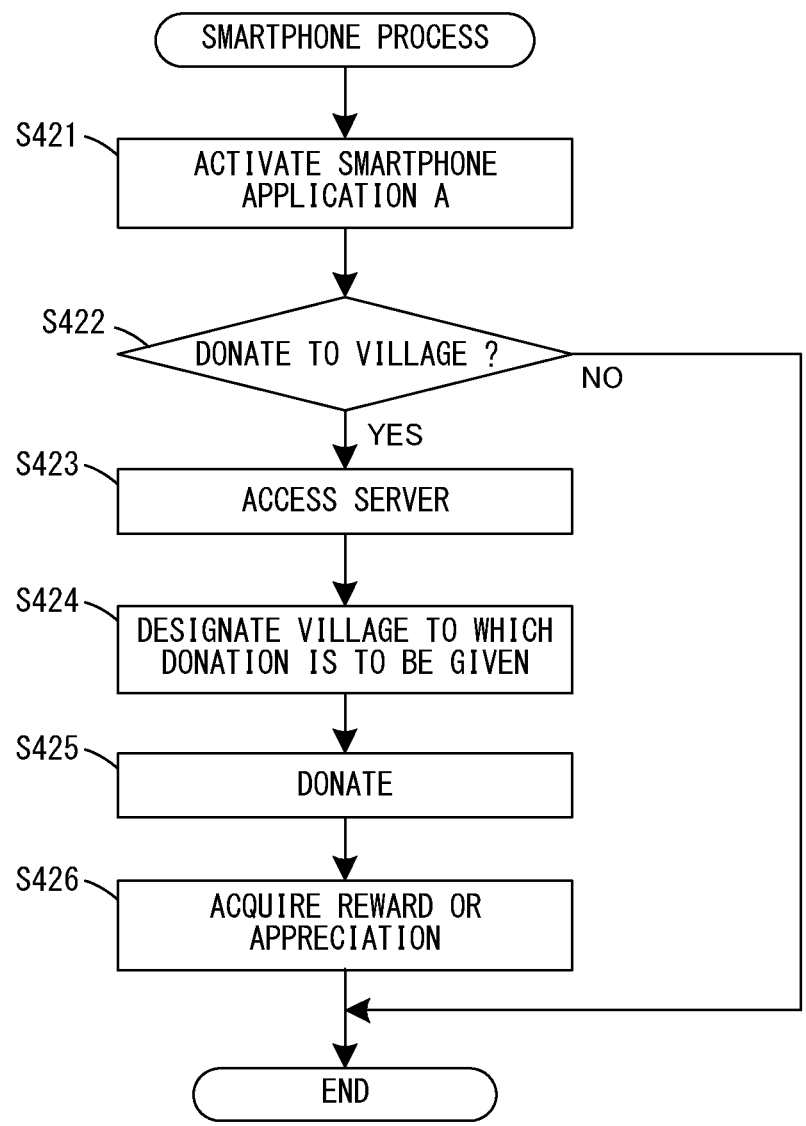
FIG. 21 is an example non-limiting flowchart showing an example of a process performed in the smartphone 4 of the information processing system 1 shown in FIG. 20.

Next, a process performed in each smartphone 4 of the information processing system 1 shown in FIG. 20 will be described. FIG. 21 is a flowchart showing an example of a process performed in each smartphone 4 of the information processing system 1 shown in FIG. 20.

As shown in FIG. 21, the smartphone 4 initially activates the smartphone application A (step S421) and determines whether to give a donation to a village (step S422). For example, a menu for causing the user to select whether to give a donation is displayed on the screen of the smartphone 4. When the smartphone 4 determines to give a donation (step S422: YES), the smartphone 4 accesses the server system 2 (step S423).

Subsequently, in the smartphone 4, a village to which the predetermined item is to be donated is designated (step S424). For example, the user designates a village by inputting the identification information of the village. Alternatively, the user of the smartphone 4 may designate a village by searching for the village on the screen of the smartphone 4 and selects the village from a list of the search result. Then, the donation is given to the designated village (step S425). Thereafter, the smartphone 4 acquires a reward or appreciation for the donation from the server system 2 (step S426). This is the end of the description of the process shown in FIG. 21.

(Process in Server System 2 in FIG. 20)

Figure 22:
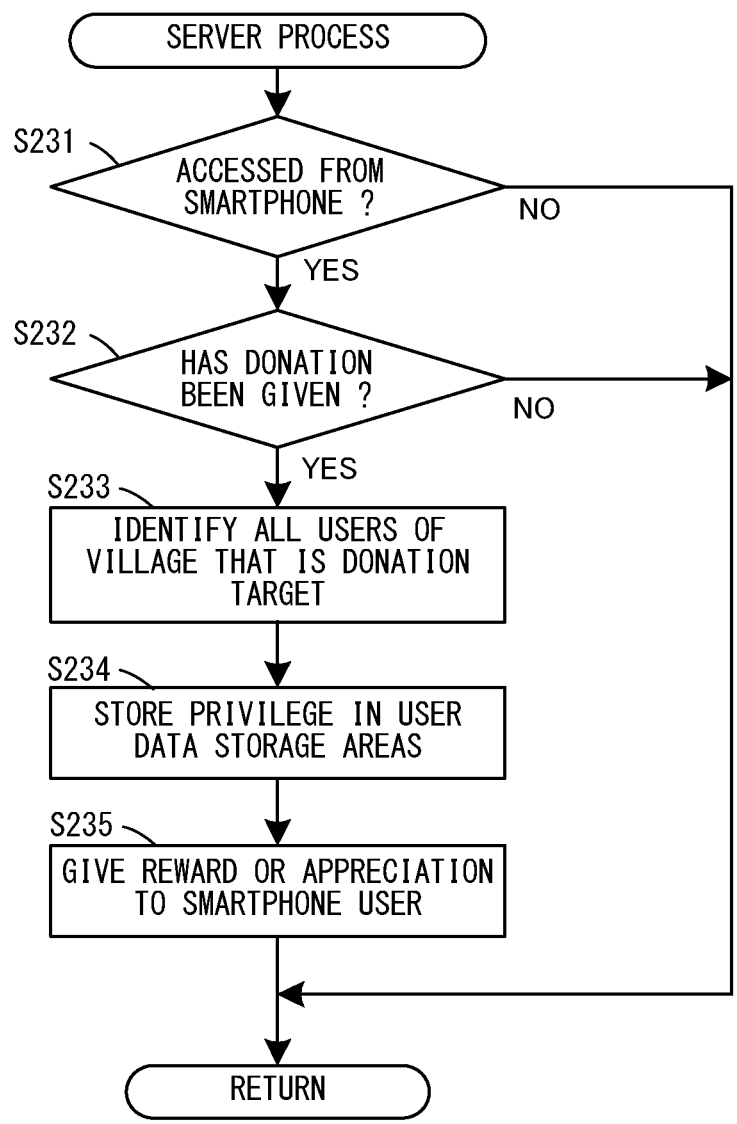
FIG. 22 is an example non-limiting flowchart showing an example of a process performed in the server system 2 of the information processing system 1 shown in FIG. 20.

FIG. 22 is a flowchart showing an example of a process performed in the server system 2 of the information processing system 1 shown in FIG. 20.

First, the server system 2 determines whether the server system 2 is being accessed from any smartphone 4 (step S231). Specifically, the server system 2 determines whether the server system 2 is being accessed from any smartphone 4, and, when the server system 2 is being accessed from any smartphone 4, the server system 2 obtains the user ID from the smartphone 4, and determines to permit the access from the smartphone 4 by determining whether the acquired user ID agrees with any of the user IDs of the smartphones 4 registered in the server system 2 in advance. When the server system 2 determines to permit the access from the smartphone 4 (step S231: YES), the server system 2 determines whether identification information of a village has been designated and the predetermined item has been donated (step S232).

When the predetermined item has been donated (step S232: YES), the server system 2 identifies all users having the identification information of a village that is the donation target (step S233). As descried above, the user ID of the game machine 3 includes identification information of the village of the user. The server system 2 identifies all users having the identification information of the same village.

Then, the server system 2 stores a privilege in the user data storage areas corresponding to the identified users (step S234). For example, the server system 2 stores an item to be used in the game A, in the user data storage areas. In addition, the server system 2 stores information (e.g., the user ID, the user name, a message from the user) about the user of the smartphone 4 who has given the donation, in the user data storage areas corresponding to the identified users. Accordingly, the user of the game machine 3 can acquire the item stored in the user data storage area, by accessing the server system 2. In addition, the user of the game machine 3 can acquire the information, about the user who has given the donation, stored in the user data storage area, by accessing the server system 2.

Thereafter, the server system 2 gives a reward or appreciation to the user of the smartphone 4 who has donated the predetermined item (step S235). This is the end of the description of the process shown in FIG. 22.

As described above, in the example shown in FIG. 20, linkage between the terminals is made in flow opposite to that in FIG. 4. That is, whereas linkage of data from the game machine 3 to the smartphone 4 is made in FIG. 4, linkage of data from the smartphone 4 to the game machine 3 is made in the example shown in FIG. 20. By making such linkage of data from the smartphone 4 to the game machine 3, the user of the smartphone 4 and the user of the game machine 3 can cooperate to play the game.

As described above, in the information processing system 1 according to the present embodiment, linkage between the game machine 3 and the smartphone 4 can be made by transmitting information based on game processing performed in the plurality of game machines 3 to the server system 2, totalizing the information from each game machine 3 in the server system 2, and transmitting the totalization result to the smartphone 4. In addition, linkage between the game machine 3 and the smartphone 4 can be made by transmitting information based on a process (e.g., a process of donating a predetermined item) performed in the plurality of smartphones 4 to the server system 2, and granting a privilege to the game machine 3 in the server system 2. Accordingly, the convenience and/or the interest of the application executed in each terminal can be improved.

The linkage from the game machine 3 to the smartphone 4 shown in FIG. 4 may be made from the smartphone 4 to the game machine 3. That is, information based on game processing performed in the plurality of smartphones 4 may be transmitted to the server system 2, and the server system 2 may totalize the received information based on the game processing and transmit the totalization result to the game machine 3. In the game machine 3, as described above, the totalization result can be referred to. Similarly, the linkage from the smartphone 4 to the game machine 3 shown in FIG. 20 may be made from the game machine 3 to the smartphone 4. That is, a donation of a predetermined item may be given from the user of the game machine 3 to the user of the smartphone 4, and the user of the smartphone 4 who has received the donation may acquire a privilege corresponding to the donation. In this case, the user of the game machine 3 who has given the donation can receive a reward or appreciation corresponding to the donation.

The game in the above-described embodiment is merely an example, and another game may be performed.

The configuration of each terminal (the game machines 3 and the smartphones 4) is merely an example, and the information processing system 1 may be realized by using terminals having other configurations.

The processes shown in the above-described flowcharts (FIGS. 14 to 19, 21, and 22) are merely an example, and the order or contents of the processes may be changed as appropriate.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system comprising a plurality of user terminals of a first type, a user terminal of a second type different from the first type, and a server system,
   each of the user terminals of the first type configured to:
      perform game processing based on an operation of a user, and
      transmit, during a first transmission process, information based on the game processing to the server system,
   the plurality of user terminals of the first type including a first user terminal operated by a first user and a second user terminal operated by a second user,
   the server system configured to:
      receive, during a first reception process, first information, based on a result of the game processing from the first user terminal of the first type, and second information based on a result of the game processing from the second user terminal of the first type,
      totalize the first information and the second information received by the first reception process to generate a totalization result, and
      transmit, during a second transmission process, the totalization result to the user terminal of the second type, and
   the user terminal of the second type configured to:
      receive, during a second reception process, the totalization result transmitted from the server system, and
      perform information processing different from the game processing by using the totalization result received by the second reception process, wherein
   each of the user terminals of the first type executes a first game application and executes the game processing during the execution of the first game application,
   the user terminal of the second type executes a second game application different from the first game application and executes the information processing different from the game processing, by using the totalization result, during the execution of the second game application, and
   the totalization result is generated based on the first and second information associated with the result of the game processing from the first and second user terminals of the first type, while excluding a result of processing performed by the user terminal of the second type including, at least, the information processing different from the game processing and information processing associated with execution of the second game application.

2. The information processing system according to claim 1, wherein
   each user terminal of the first type performs a counting process during the game processing,
   each user terminal of the first type transmits a counting result of the counting process as the information based on the game processing in the first transmission process,
   the server system receives the counting result transmitted from each user terminal of the first type in the first reception process, and
   the server system totalizes the counting result received by the first reception process.

3. The information processing system according to claim 2, wherein each user terminal of the first type performs the counting process on the basis of a specified motion of an object in a virtual space.

4. The information processing system according to claim 2, wherein the server system performs a privilege grant process of granting a privilege to each user terminal of the first type when a value of the totalization result exceeds a specified value.

5. The information processing system according to claim 4, wherein the privilege is at least one of an item, a character, an image, and a sound that are usable in each user terminal of the first type, currency used in a game, and a stage in a game.

6. The information processing system according to claim 2, wherein the server system performs a second privilege grant process of granting a privilege to the user terminal of the second type when a value of the totalization result exceeds a specified value.

7. The information processing system according to claim 6, wherein the privilege is at least one of an item, a character, an image, and a sound that are usable in the user terminal of the second type, currency used in a game, and a stage in a game.

8. The information processing system according to claim 1, wherein
each user terminal of the first type performs a selection process of selecting an object in the game processing,
each user terminal of the first type transmits a selection result by the selection process, as the information based on the game processing, in the first transmission process,
the server system receives the selection result, transmitted from each user terminal of the first type, in the first reception process, and
the server system totalizes the selection result received by the first reception process.

9. The information processing system according to claim 8, wherein a process of making an object corresponding to the totalization result usable in the user terminal of the second type is performed.

10. The information processing system according to claim 9, wherein each user terminal of the first type excludes the object made usable in the user terminal of the second type from objects to be selected in the selection process.

11. The information processing system according to claim 1, wherein
each user terminal of the first type sets a specific parameter in a game on the basis of an input of the user,
the server system receives the specific parameter transmitted from each user terminal of the first type in the first reception process, and
the server system totalizes the specific parameter received by the first reception process.

12. The information processing system according to claim 1, wherein
each user terminal of the first type includes a first communication device,
the user terminal of the second type includes a second communication device different from the first communication device, and
the second communication device is configured to connect to a WAN.

13. The information processing system according to claim 1, wherein
each user terminal of the first type includes a first operation section including a plurality of physical buttons for performing the game processing, and
the user terminal of the second type includes a second operation section different from the first operation section.

14. The information processing system according to claim 1, wherein the server system performs the totalization process every time the information is transmitted from the user terminal of the first type.

15. The information processing system according to claim 1, wherein the server system performs the totalization process at specified time intervals.

16. The information processing system according to claim 1, wherein
the plurality of user terminals include at least game machines and/or smartphones,
when the totalization result satisfies a specified condition, the server grants a privilege to the game machines and/or smartphones, and
the smartphones are configured to donate the privilege to at least one of the game machines.

17. The information processing system according to claim 1, wherein the first game application includes at least first and second parameters, and the server generates a first totalization result by totalizing information associated with the first parameter and a second totalization result by totalizing information associated with the second parameter.

18. An information processing method performed in an information processing system including a plurality of user terminals of a first type, a user terminal of a second type different from the first type, and a server system, the information processing method comprising:
at each user terminal of the first type:
performing game processing based on an operation of a user, and
transmitting, during a first transmission process, information based on the game processing to the server system,
at the server system:
receiving, during a first reception process, first information, based on a result of the game processing from the first user terminal of the first type, and second information based on a result of the game processing from the second user terminal of the first type,
totalizing the first information and the second information received in the first reception process to generate a totalization result, and
transmitting, during a second transmission process, the totalization result to the user terminal of the second type, and
at the user terminal of the second type:
receiving, during a second reception process, the totalization result transmitted from the server system, and
performing information processing different from the game processing by using the totalization result received in the second reception process, wherein
each of the user terminals of the first type executes a first game application and executes the game processing during the execution of the first game application,
the user terminal of the second type executes a second game application different from the first game application and executes the information processing different from the game processing, by using the totalization result, during the execution of the second game application, and
the totalization result is generated based on the first and second information associated with the result of the game processing from the first and second user terminals of the first type, while excluding a result of processing performed by the user terminal of the second type.

19. The information processing method of claim 18, wherein the result of the processing performed by the user terminal of the second type includes, at least, the information processing different from the game processing and information processing associated with execution of the second game application.

* * * * *